US012551527B2

(12) United States Patent
Iyer et al.

(10) Patent No.: US 12,551,527 B2
(45) Date of Patent: Feb. 17, 2026

(54) DRUG DELIVERY SYSTEMS FOR TREATMENT OF INFECTIONS

(71) Applicant: Wayne State University, Detroit, MI (US)

(72) Inventors: Arun K. Iyer, Troy, MI (US); Samaresh Sau, Detroit, MI (US); Michael Rybak, Detroit, MI (US); Ketki Bhise, Detroit, MI (US); Razie Kebriaei, Detroit, MI (US)

(73) Assignee: Wayne State University, Detroit, MI (US)

( * ) Notice: Subject to any disclaimer, the term of this patent is extended or adjusted under 35 U.S.C. 154(b) by 759 days.

(21) Appl. No.: 16/958,647

(22) PCT Filed: Dec. 28, 2018

(86) PCT No.: PCT/US2018/068021
§ 371 (c)(1),
(2) Date: Jun. 26, 2020

(87) PCT Pub. No.: WO2019/133916
PCT Pub. Date: Jul. 4, 2019

(65) Prior Publication Data
US 2020/0368313 A1 Nov. 26, 2020

Related U.S. Application Data

(60) Provisional application No. 62/612,191, filed on Dec. 29, 2017.

(51) Int. Cl.
*A61K 38/14* (2006.01)
*A61K 9/127* (2006.01)
*A61K 31/546* (2006.01)
*A61K 47/54* (2017.01)
*A61P 31/04* (2006.01)

(52) U.S. Cl.
CPC .............. *A61K 38/14* (2013.01); *A61K 9/127* (2013.01); *A61K 31/546* (2013.01); *A61K 47/545* (2017.08); *A61P 31/04* (2018.01)

(58) Field of Classification Search
CPC ...... A61K 38/14; A61K 9/127; A61K 31/546; A61K 47/545; A61K 9/1271; A61K 47/551; A61K 47/6911; A61P 31/04; A61P 1/00; A61L 15/44; A61L 15/46; A61L 2300/406; A61L 2300/626; A61L 2300/64; A61L 2400/12
See application file for complete search history.

(56) References Cited

U.S. PATENT DOCUMENTS

| 9,566,238 | B2 * | 2/2017 | Pumerantz | ............. A61K 38/14 |
| 10,646,581 | B2 | 5/2020 | Low et al. | |
| 2006/0222695 | A1 | 10/2006 | Zadini et al. | |
| 2006/0222716 | A1 | 10/2006 | Schwarz et al. | |
| 2008/0138351 | A1 | 6/2008 | Dwek et al. | |
| 2009/0105126 | A1 * | 4/2009 | Li | ............. A61P 11/00 424/450 |
| 2013/0115273 | A1 | 5/2013 | Yang et al. | |
| 2013/0136788 | A1 | 5/2013 | Gupta | |
| 2013/0209537 | A1 | 8/2013 | Fu-Giles | |
| 2014/0220110 | A1 * | 8/2014 | Hayes | ............. A61K 9/1275 514/383 |
| 2016/0193148 | A1 | 7/2016 | Giguere et al. | |

FOREIGN PATENT DOCUMENTS

| WO | WO9319738 A1 | 10/1993 | | |
| WO | WO2007005754 A2 | 1/2007 | | |
| WO | WO2009044406 A2 | 4/2009 | | |
| WO | WO2014052634 A1 | 4/2014 | | |
| WO | WO-2014160121 A1 * | 10/2014 | ............. A61K 38/14 |
| WO | WO-2017139417 A1 * | 8/2017 | ......... A61K 31/7088 |

OTHER PUBLICATIONS

Cern et al., J. Control Release, Jan. 10, 2014; 173: 125-131 (Year: 2014).*
Siebert et al., J. Infectious Diseases, vol. 139, No. 4, Apr. 1979, 452-457. (Year: 1979).*
Rezler et al., J. Am. Chem. Soc. 2007, 129, 4961-4972 (Year: 2007).*
Zaleski et al., Antimicrobial Agents and Chemotherapy, Nov. 2006, vol. 50, No. 11, p. 3856-3860 (Year: 2006).*
Pumerantz, et al., "Preparation of liposomal vancomycin and intracellular killing of meticillin-resistant *Staphylococcus aureus* (MRSA)", International Journal Of Antimicrobial Agents, vol. 37, No. 2, 2011, pp. 140-144.
Seedat, et al., "Co-encapsulation of multi-lipids and polymers enhances the performance of vancomycin in lipid-polymer hybrid nanoparticles: In vitro and in silico studies", Materials Science and Engineering C, vol. 61, 2015, pp. 616-630.
Bhise, et al., "Combination of Vancomycin and Cefazolin Lipid Nanoparticles for Overcoming Antibiotic Resistance of MRSA," Materials, vol. 11, No. 7, 2018, 13 pgs.
Cortesi, et al., "Preparation of liposomes by reverse-phase evaporation using alternative organic solvents," Journal of Microencapsulation, vol. 16, No. 2, 1999, pp. 251-256.
Friedman, et al., "*Staphylococcus aureus* Redirects Central Metabolism to Increase Iron Availability," PLoS Pathogens, vol. 2, No. 8, 2006, pp. 777-789.
Hanke, et al., "Targeting macrophage activation for the prevention and treatment of *Staphylococcus aureus* biofilm infections," J. Immunol., vol. 190, No. 5, 2013, pp. 2159-2168.

(Continued)

*Primary Examiner* — Robert S Cabral
(74) *Attorney, Agent, or Firm* — Lee & Hayes, P.C.

(57) ABSTRACT

Lipid-based drug delivery vehicles (including liposomal nanoparticles) are described which include antibiotic(s) for the treatment of infections, such as Methicillin-Resistant *Staphylococcus (S.) aureus* (MRSA) infections and Methicillin-Susceptible *S. aureus* (MSSA) infections. These drug delivery vehicles have high drug-loading, do not accumulate in the liver, and can optionally include one or more targeting ligands.

14 Claims, 16 Drawing Sheets

(56) References Cited

OTHER PUBLICATIONS

Jansen, et al., "Selective inhibitors of fibroblast activation protein (FAP) with a xanthine scaffold," MedChemComm., vol. 5, No. 11, 2014, pp. 1700-1707.

Liu, George, "Molecular Pathogenesis of *Staphylococcus aureus* Infection," Pediatr. Res., vol. 65, No. 5 Pt 2, 2009, 14 pgs.

Lone, et al., "*Staphylococcus aureus* induces hypoxia and cellular damage in porcine dermal explants," Infection and Immunity, vol. 83, No. 6, 2015, pp. 2531-2541.

Pei, et al., "Particle engineering for intracellular delivery of vancomycin to methicillin-resistant *Staphylococcus aureus* (MRSA)-infected macrophages," Journal of Controlled Release, vol. 267, 2017, pp. 133-143.

Shen, et al., "Folate receptor-Beta constitutes a marker for human proinflammatory monocytes," Journal of Leukocyte Biology, vol. 96, No. 4, 2014, pp. 563-570.

Smith, et al., "Carbonic anhydrase is an ancient enzyme widespread in prokaryotes," PNAS USA, vol. 96, No. 26, 1999, pp. 15184-15189.

Supuran, Claudiu, "Bacterial carbonic anhydrases as drug targets: toward novel antibiotics?," Frontiers in Pharmacology, vol. 2, No. 34, 2011, 6 pgs.

Invitation to Pay Fees for Application No. PCT/US2018/068021, mailed on Mar. 8, 2019, 2 pgs.

McConeghy, et al., "The Empirical Combination of Vancomycin and a beta-Lactam for Staphylococcal Bacteremia", Healthcare Epidemiology, CID, vol. 57, 2013, pp. 1760-1765.

Moghadas-Sharif, et al., "The Effect of Nanoliposomal Formulations on Staphylococcus Epidermidis Biofilm", Drug Development and Industrial Pharmacy, 2014, 6 pgs.

PCT Search Report & Written Opinion for Application No. PCT/US18/68021, mailed on May 1, 2019, 13 pgs.

* cited by examiner

FIG. 8A
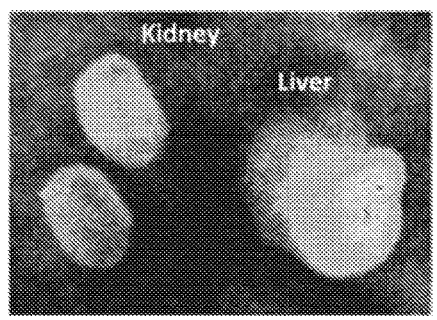 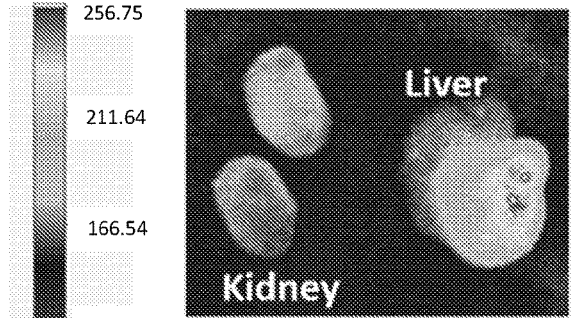 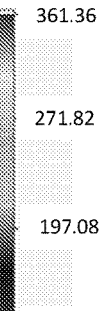
10 sec.
FIG. 8B
20 sec.
FIG. 8C
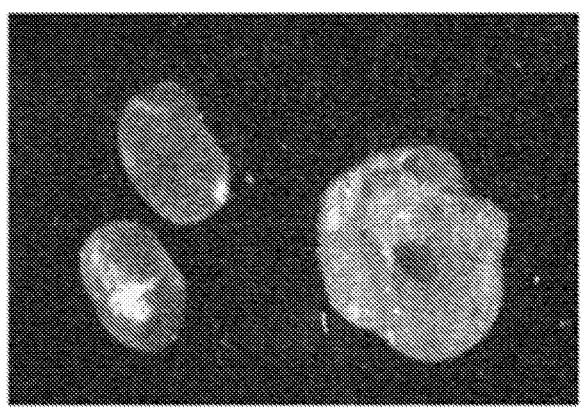
FIG. 8D
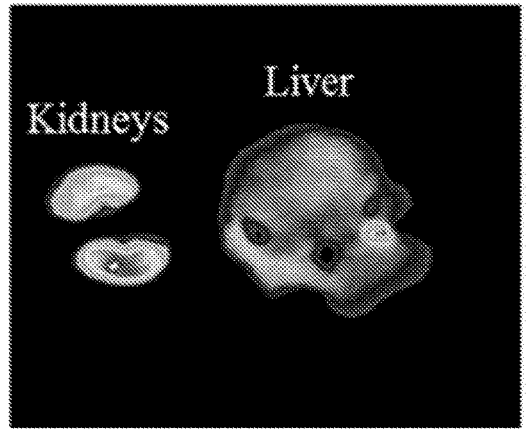 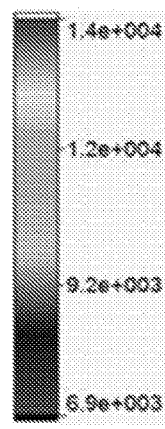

Vancomycin (VAN)

Cefazolin (CFZ)

DRUG DELIVERY SYSTEMS FOR TREATMENT OF INFECTIONS

CROSS-REFERENCE TO RELATED APPLICATIONS

This application is the 35 U.S.C. § 371 U.S. National Phase Application based on International Patent Application No. PCT/US2018/068021, which was filed on Dec. 28, 2018, which claims priority to 62/612,191 filed on Dec. 29, 2017, which is incorporated herein by reference in its entirety as if fully set forth herein.

FIELD OF THE DISCLOSURE

This disclosure relates to lipid-based nanoparticles containing (loaded with) one or more antibiotic(s), for instance for the treatment of Methicillin-Resistant *Staphylococcus* (*S.*) *aureus* (MRSA) and/or Methicillin-Susceptible *S. aureus* (MSSA) infections. These drug delivery vehicles have high drug-loading and can optionally include one or more site targeting ligands, such as infection site targeting ligand(s).

BACKGROUND OF THE DISCLOSURE

Vancomycin is currently the primary treatment for Methicillin-Resistant *Staphylococcus* (*S.*) *aureus* (MRSA) bacterial strain infections. However, the primary limitation of vancomycin use is acute nephrotoxicity, which is dose and duration related. Similarly, it has been observed that cefazolin, a first-generation cephalosporin, is effective to treat Methicillin-Susceptible *S. aureus* (MSSA) strains but is not effective against MRSA.

SUMMARY OF THE ASPECTS OF THE DISCLOSURE

When cefazolin (or another beta-lactam antibiotic) is combined with vancomycin, it is synergistic against *S. aureus* strains including MRSA. This combination can prevent, reduce, or delay emergence of resistance to vancomycin. Thus, clinically the combination of vancomycin and cefazolin increases potential efficacy and potentially reduces the emergence of resistance. However, some of the challenges of vancomycin and cefazolin are (a) nephrotoxicity, (b) poor bacterial biofilm penetration, c) indiscriminate organ distribution of the free agents, and (d) poor accumulation of these antibiotics in the sites of infection. Thus, reducing the nephrotoxicity potential and maintaining higher and effective concentrations of these antibiotics at the infection site is beneficial for successful clinical therapy. Described herein are stealth liposomes loaded with vancomycin and cefazolin that show enhanced bacterial cell killing and reduced potential for side effects as compared to free drugs. Stealth liposomes include polyethylene glycol (PEG) functional group(s) exposed outside of the liposome bilayer, which assists to avoid detection by the body's immune system, thus improving plasma circulation (Bhise et al., *Materials*, 11(7), 1245, 2018). Moreover, because of the stealth characteristic, these liposomes exhibit reduced nephrotoxicity due to lower accumulation in the kidneys, which will cumulatively enhance the effectiveness of the liposomal antibiotic combination. Since nephrotoxicity is a very relevant clinical issue faced by the majority of clinicians and patients who utilize vancomycin, the disclosed technology overcomes the short fall in terms of patient efficacy and safety.

Herein-described engineered liposomes have favorable feature such as (i) high therapeutic content (e.g., vancomycin and cefazolin loading); (ii) nano-sized diameter, (iii) sustained antibiotic releasing nature; and (iv) high stability in the serum and biological milieu. These features increase accumulation in infected tissues at a lower dose of drug combinations than free antibiotics. Results demonstrate effective bacterial cell killing using liposomal vancomycin and cefazolin in combination, compared to free antibiotics. Additionally, the liposomes can be engineered with optional surface decorated macrophage targeting ligands or bacterial cell wall penetrating agents, enabling selective delivery of antibiotics to infected sites and tissues. This can augment bactericidal activities in comparison to free agents, with reduced side effects.

In addition to injectable liposomal-formulations, sustained vancomycin and cefazolin releasing multivesicular liposome (MVL) and nanogels for use as topical ointments and in situ injections at the site of bacterial infections are also described. The advantages of MVL and nanogels are that they can reside at the site of injections for weeks to months and sustainably release the antibiotics to the infected site over a long period of time. Thus, patients do not need to visit the clinic for frequent injections. Instead they can be treated less frequently. The MVL and nanogels can include biocompatible lipids, such as cholesterol, phospholipids, natural oils, and polymers.

BRIEF DESCRIPTION OF THE DRAWINGS

Many of the drawings submitted herein are better understood in color. Applicants consider the color versions of the drawings as part of the original submission and reserve the right to present color images of the drawings in later proceedings.

FIG. 7A shows right field microscopy images of Rhodamine B liposomes treated in RAW 264.7 cells. FIG. 7B shows the signal for Hoechst 33342 channel of the same cell field, indicating nuclear staining. FIG. 7C shows the signal for Rhodamine B channel, indicating cytosol staining.

FIG. 7D shows merged Rhodamine B and Hoechst 33342 signals, with no co-localization in cells.

FIG. 8A-8D illustrate the low kidney uptake of vancomycin-fluorescent dye encapsulated liposomes, demonstrating that liposomal formulations described herein address the kidney toxicity issue of vancomycin. 20 nmole vancomycin-50456 liposome is illustrated, at 10 second (FIG. 8A) and 20 second (FIG. 8B) exposure near infrared imaging of kidney and liver, compared to the corresponding bright field images (FIG. 8C). FIG. 8D shows high kidney uptake for free (commercially available) vancomycin.

(FIG. 12A) VAN and CFZ together (co-encapsulated) in one liposome (referred to herein as L(VAN+CFZ)); (FIG. 12B) VAN is encapsulated in a liposome (referred to herein as LVAN); and (FIG. 12C) CFZ is encapsulated in liposome (referred to herein as LCFZ). Each of these can be used for achieving superior MRSA treatment, as detailed more fully herein. In some embodiments, a mixture of LVAN and LCFZ is used (referred to herein as LVAN+LCFZ).

DETAILED DESCRIPTION

Figure 1:
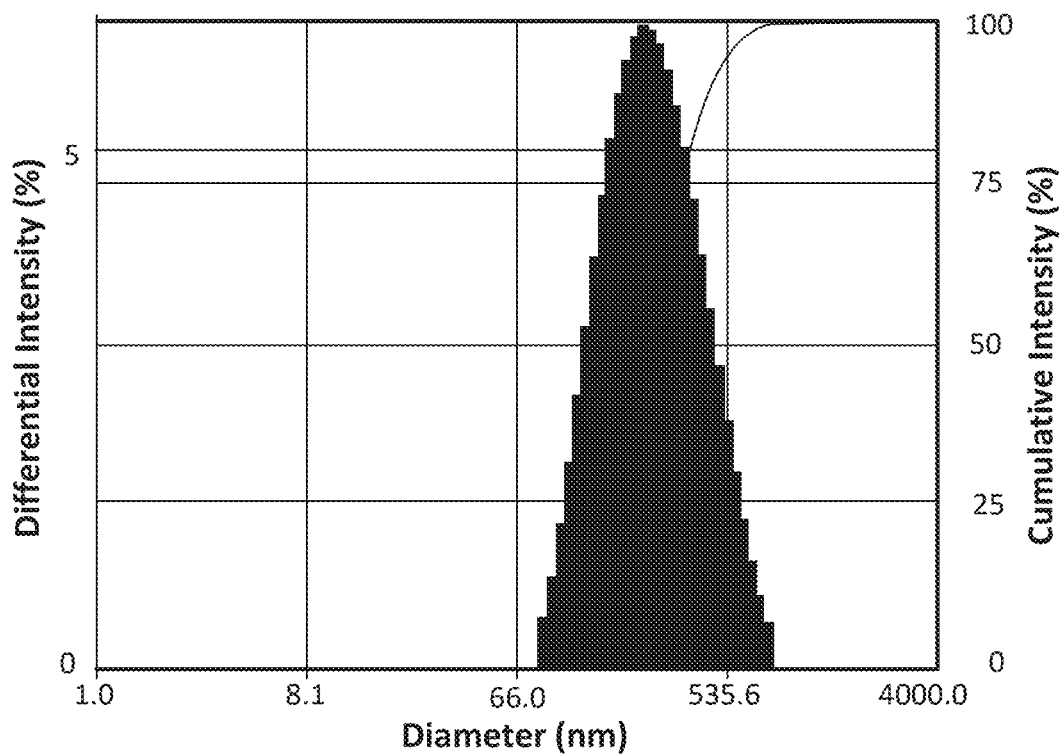
FIG. 1 is a histogram illustrating Dynamic Light Scattering (DLS) analysis of freshly made cefazolin liposomes, which shows a narrow size distribution.

*Staphylococcus* (S.) *aureus* is a serious pathogen and a leading cause of community and hospital-acquired infections. It is the primary cause of lower respiratory tract infections and surgical site infections, and the second leading cause of hospital acquired bloodstream infections, pneumonia, and cardiovascular infections. Thus, there is a great demand for better understanding and evaluation of *S. aureus* resistance patterns towards different treatment strategies.

During *S. aureus* infection wound healing processes, leukocytes (resting macrophages, M1-like pro-inflammatory and M-2 like anti-inflammatory, NK-cells) infiltrate the bacterial biofilm. The biofilm of *S. aureus* is a hypoxia condition (low oxygenated condition) (Lone et al., Infect. Immun. 83:2531-2541, 2015). The deprivation of oxygen is a negative regulator of leukocytes and fibroblasts mediated wound healing of the MRSA infected area. A minimum oxygen level is required for replication and proper function of leukocytes and fibroblasts during the wound healing process and angiogenesis in chronic wounds. As biofilm communities consume oxygen, there is more demand of oxygen for survival of the bacterial biofilm. That is attribute to hypoxic condition, as a result *S. aureus* released in larger amounts by lactic and pyruvic acid than the non-infected tissue. Data showed that bacterial-origin lactic and pyruvic acid could contribute to the higher activity in the media of infected explants (Lone et al., Infect. *Immun.* 83:2531-2541, 2015).

Under acidic conditions, there is an elevation of carbonic anhydrase (CA) enzyme isoforms, such as in many cancers, inflammatory, and infectious disease conditions. Thus, we hypothesized that CA-expression may also be elevated in *S. aureus* biofilms. There are few reports to target CA in *S. aureus biofilm* (Smith et al., *Proc Natl Acad Sci USA*. 96(26):15184-15189, 1999; Supuran et al., *Front. Pharmacol., doi.org*/10.3389/fphar.2011.00034, 2011).

In particular embodiments, the current disclosure provides high loading, biocompatible formulations of vancomycin and cefazolin using a novel method of encapsulation in lipid nanoparticles. This formulation reduces the nephrotoxicity as well as increases effectiveness due to selective accumulation in infected sites. These loaded nanoparticles exhibit (i) enhanced permeability and retention of nanoparticles at inflamed or infected tissue; (ii) the ability to penetrate bacterial biofilm; and (iii) ability to target infection associated macrophages, and enzymes of bacterial metabolism pathway, such as carbonic anhydrase that can enhance biofilm penetration and or efficacy, thereby promoting better bacterial cell killing.

In particular embodiments, the nanoparticles include one or more of natural, non-immunogenic phospholipids, sphingolipids, ceramides, cholesterol, antifouling zwitterionic lipids and/or PEGylated lipid, cell penetrating cationic polymer and lipid, oleic acid, and/or natural oil. A modified thin film, reverse phase evaporation-ethanol injections method is described herein for encapsulation of therapeutic compound(s) (such as vancomycin/cefazolin) into the liposome, resulting in high loading. Such high loading of antibiotics in liposomal formulations has not been previously achieved. Particularly, the literature (Pei et al., *J Controlled Release* 267:133-143, 2017) has reported that encapsulation of vancomycin into liposomes is very challenging, with less than 1-5% (w/w) of drug loading.

The current disclosure provides methods to apply reverse phase evaporation techniques for encapsulation of vancomycin and cefazolin into liposomes with high antibiotic loading efficiency of at least 10% (w/w). Using this nanoengineering technology, both vancomycin and cefazolin can be encapsulated in one liposomal formulation, as well as in individual formulations, based on patient needs and required doses. This drug loading methodology can be applied to a wide variety of lipid compositions. Lipid-nanoparticles of vancomycin and cefazolin provide better therapeutic agents in comparison to the free drug combinations.

There is provided in a further embodiment a method of treating *Staphylococcus* (*S.*) *aureus* infection in a subject in need thereof, including administering to the subject a therapeutically effective amount of a liposomal nanoparticle including: a lipid component including a 1:0.5:0.07 ratio of HSPC to cholesterol to DSPE-mPEG, or a 1:0.05:0.007:0.007 ratio of HSPC to cholesterol to DSPE-m PEG to DSPE-PEG-Folate; or a 1:0.5:0.07 ratio of DOTAP to cholesterol to DSPE-mPEG; at least 10% vancomycin; and cefazolin, thereby treating *S. aureus* infection in the subject. By way of example, the liposomal nanoparticle may be made using a modified water in oil (reverse phase) evaporation method described herein.

Yet another embodiment provides a method of treating *Staphylococcus* (*S.*) *aureus* infection in a subject in need thereof, which method includes administering a therapeutically effective amount of a drug delivery system including vancomycin and cefazolin to the subject thereby treating *S. aureus* infection in the subject. In specific examples of this method embodiment, the *S. aureus* infection is a Methicillin-Resistant *Staphylococcus aureus* (MRSA) infection or a Methicillin-Susceptible *S. aureus* (MSSA) infection. By way of example, the drug delivery system includes a liposomal nanoparticle including: a lipid component including HSPC, Cholesterol, and DSPE-m PEG; and vancomycin, cefazolin, or a mixture thereof.

Also provided are method embodiments for treating a *S. aureus* infection, wherein drug delivery system includes one or more of a nanoparticle, a macroparticle, an emulsion, an organogel, a nanogel, an ointment, a cream, a liposome, a multivesicular liposome (MLV), a microsphere, a nanosphere, and/or a detergent. By way of example, in some such methods the drug delivery system includes a lipid component including one or more of natural and synthetic phospholipid, sphingolipid, fatty acid modified lipid, cationic lipid, pH sensitive lipid, anionic lipid, neutral lipid, zwitterionic lipid, antigenic lipid, alkyl phosphate lipid, chelator functionalized lipid, glycosylated lipid, antigenic lipid, adhesive lipid, polymerizable lipid, crosslinking lipid, pegylated lipid, functionalized peg lipid, and/or a chemical conjugation to the vancomycin and/or cefazolin. For instance, examples of the drug delivery system include: one or more of natural or synthetic egg sphingosine, brain sphingosine, sphingosine (d14:1), sphingosine (d16:1), sphingosine (d17:1), sphingosine (d18:1), sphingosine (d20:1), sphingosine 4E,8Z, sphingosine 4E,11Z, 4E,14Z-Sphingadiene, Safingol, sphinganine-1-phosphate (d17:0), (d18:0), (d20:0), (d17:1), (d18:1), (d20:1), methylated sphingosine, phytosphingosine, phosphosphingolipid lipid, and/or glycosphingolipids; and/or one or more of (2S—OH) or (2R—OH) of 12:0, 16:0, 17:0, 18:0, 20:0, 22:0, 24:0, 18:1, or 24:1 Ceramide; or phytoceramide; and/or a cationic lipid including one or more of N1-[2-((1S)-1-[(3-aminopropyl)amino]-4-[di(3-amino-propyl)amino] butylcarboxamido) ethyl]-3,4-di[oleyloxy]-benzamide; 1,2-di-O-octadecenyl-3-trimethylammonium propane; (14:0), (14:1), (16:0), (16:1), (18:0), (18:1), (12:0) 1,2-dimyristoleoyl-sn-glycero-3-ethylphosphocholine; (18:1), (18:0), (16:0), (16:1), (14:0) 1,2-dioleoyl-3-trimethylammonium-propane (DOTAP/TAP); 3ß-[N-(N', N'-dimethylaminoethane)-carbamoyl]cholesterol; and/or N4-Cholesteryl-Spermine; and/or a pH sensitive lipid including one or more of 1,2-dioleoyl-3-dimethylammonium-propane; 1,2-dimyristoyl-3-dimethylammonium-propane; 1,2-dipalmitoyl-3-dimethylammonium-propane; 1,2-distearoyl-3-dimethylammonium-propane; or N-(4-carboxybenzyl)-N, N-dimethyl-2,3-bis(oleoyloxy)propan-1-aminium; and/or an anionic lipid including one or more of cholesteryl, hemisuccinate; or Dicetyl phosphate; and/or a neutral lipid including one or more of 1,2-dioctadecanoyl-sn-glycerol; 1-octadecanoyl-2-hexadecanoyl-sn-glycerol; 16:0 ethylene glycol; 1-stearoyl-2-linoleoyl-sn-glycerol; diacyl glycerols; or glycosylated diacyl glycerols; and/or a zwitterionic lipid including one or more of 3-[(3-Cholamidopropyl)dimethylammonio]-1-propanesulfonate; 3-[(3-Cholamidopropyl)dimethylammonio]-2-hydroxy-1-propanesulfonate; N,N-dimethyldodecylamine N-oxide, DOPC, POPC, DLPC, HSPC, DOPE, HSPC, or L-α-hydrogenated phosphatidylcholine; and/or an antigenic lipid including one or more of 1,2-dipalmitoyl-sn-glycero-3-phosphoethanolamine-N-(2,4-dinitrophenyl); 1,2-dipalmitoyl-sn-glycero-3-phosphoethanolamine-N-[6-[(2,4-dinitrophenyl) amino]hexanoyl; or 1,2-Dipalmitoyl-sn-Glycero-3-Phosphoethanolamine-N-(2,4,6-trinitrophenyl); and/or a polymeric, crosslinking lipid or polymerizable lipid including one or more of 1,2-bis(10,12-tricosadiynoyl)-sn-glycero-3-phosphocholine; Chol-PEG (500-5000), DSPE-PEG(500-5000)-OME, DSPE-PEG(500-5000)-SH, DSPE-PEG(500-5000)-NH2, DSPE-PEG(500-5000)-Maliamide, DSPE-PEG(500-5000)-DBCO, DSPE-PEG(500-5000)-Biotin, DSPE-PEG(500-5000)-Azide, DSPE-PEG(500-5000)-carboxylic acid, DSPE-PEG(500-5000)-Succinyl, DSPE-PEG(500-5000)-folate; 1,2-bis(10,12-tricosadiynoyl)-sn-glycero-3-phosphocholine; or C16 PEG750 Ceramide.

In yet another method of treatment embodiment, the drug delivery system includes a leucocyte targeting ligand (such as folic acid or another folate receptor ligand), fibroblast targeting ligand, neutrophil targeting ligand, or lymphocyte targeting ligand, or a targeting ligand specific to a bacterial cell or the cell of a host cell associated with a bacterial cell. For instance, the targeting ligand in some instances is a folate receptor beta (FRa,β), a toll-like receptor (TLR), a hyaluronan receptor (CD44), a T cell receptor (TCR) of immune cells, a protein A receptor on the surface of *S. aureus*, or an the extracellular protein expressed by leukocytes. Optionally, the drug delivery system used in such methods may include one or more of folic acid, methotrexate, aminopterin, antibody, peptides for targeting FR; lipopeptides, lipoprotein, small oligonucleotide sequences for targeting TLR; hyaluronic acid (HA) for targeting CD44; linagliptin, and other xanthine scaffold for targeting fibroblast activation protein (FAP) of wound fibroblast cells;

Also provided are method of treatment embodiments in which the drug delivery system includes a carbonic anhydrase (CA) targeting ligand. Optionally, this may be combined with the other method embodiments described herein. By way of example, the CA targeting ligand includes imidazole, sulfoimidazole derivative, acetazolamide; methazolamide; ethoxzolamide; dichorophenamide; dorzolamide; brinzolamide; benzolamide; topiramate; zonisamide; sulpiride; indisulam; celecoxib; valdecoxib; antibody, or a peptide. In a particular example method, the CA targeting ligand is acetazolamide.

Also provided are method embodiments, wherein the targeting ligand, the vancomycin, and/or the cefazolin is chemically conjugated with lipid molecule(s) of the liposomes.

It is contemplated in examples of the treatment methods provided herein, that the treatment is a therapeutic or a prophylactic treatment. Further, it is contemplated that the administering includes at least one of injection, oral administration, or topical administration.

In yet other method of treatment embodiments (which may overlap with those discussed above), the nanoparticle includes a 1:10 ratio of vancomycin to lipid, or a 1:1 ratio of cefazolin to lipid.

In yet other method of treatment embodiments (which may overlap with those discussed above), the nanoparticle includes a 1:0.5:0.07 ratio of HSPC to cholesterol to DSPE-mPEG, or a 1:0.05:0.007:0.007 ratio of HSPC to cholesterol to DSPE-mPEG to DSPE-PEG-Folate; or a 1:0.5:0.07 ratio of DOTAP to cholesterol to DSPE-mPEG.

By way of example, the nanoparticle used in a provided method of treatment is within a population of nanoparticles having a mean diameter of 192.9 nm, or having a mean diameter of 176.5 nm.

In yet other method of treatment embodiments (which may overlap with those discussed above), the nanoparticle includes at least 10% vancomycin, or at least 30% vancomycin.

Also provided herein are methods of reducing the nephrotoxicity associated with therapeutic vancomycin administration to a subject, the method including administering (for instance, by inject, oral administration, or topical administration) a preparation including a therapeutically effective amount of a lipid nanoparticle including vancomycin and cefazolin to the subject thereby reducing the nephrotoxicity associated with therapeutic vancomycin administration in the subject. By way of example, in some such methods the therapeutic vancomycin administration provides one or more of: a therapeutic treatment in the subject; a prophylactic treatment in the subject; an anti-infection effect against a Methicillin-Resistant *Staphylococcus aureus* (MRSA) infection; and/or an anti-infection effect against a Methicillin-Susceptible *S. aureus* (MSSA) infection.

In examples of the reducing nephrotoxicity method, the lipid nanoparticle includes a leucocyte targeting ligands (such as folic acid). In examples of the reducing nephrotoxicity methods,
the lipid nanoparticle includes a carbonic anhydrase (CA) targeting ligand (such as acetazolamide).

In yet further example methods of reducing the nephrotoxicity associated with therapeutic vancomycin administration to a subject, the nanoparticle includes a 1:10 ratio of vancomycin to lipid; and/or the nanoparticles includes a 1:1 ratio of cefazolin to lipid; and/or the nanoparticle includes a 1:5:0.07 ratio of HSPC to cholesterol to DSPE-mPEG; and/or the nanoparticle includes a 1:0.05:0.007:0.007 ratio of HSPC to cholesterol to DSPE-mPEG to DSPE-PEG-Folate; and/or a 1:0.5:0.07 ratio of DOTAP to cholesterol to DSPE-mPEG; and/or the nanoparticle is within a population of nanoparticles having a mean diameter of 192.9 nm, or within a population of nanoparticles having a mean diameter of 176.5 nm.

Also provided are embodiments of lipid nanoparticle or drug delivery systems, which including at least 10% vancomycin. Optionally, such nanoparticle or drug delivery systems may further including cefazolin, and/or a leucocyte targeting ligand (such as folic acid), and/or a carbonic anhydrase (CA) targeting ligand (such as Acetazolamide). In examples of lipid nanoparticle or drug delivery system embodiments, the lipid nanoparticle or drug delivery system is formulated for injection, for topical administration, for oral administration, or for use within a transdermal patch or wound dressing.

In yet further examples of lipid nanoparticle or drug delivery system embodiments, the lipid nanoparticle or drug delivery system includes a 1:10 ratio of vancomycin to lipid; and/or a 1:1 ratio of cefazolin to lipid; and/or a 1:0.5:0.07 ratio of HSPC to cholesterol to DSPE-mPEG; and/or a 1:0.05:0.007:0.007 ratio of HSPC to cholesterol to DSPE-mPEG to DSPE-PEG-Folate; and/or a 1:0.5:0.07 ratio of DOTAP to cholesterol to DSPE-mPEG; and/or the nanoparticle includes at least 30% vancomycin.

In yet further examples of lipid nanoparticle or drug delivery system embodiments, the lipid nanoparticle or drug delivery system is within a population of nanoparticles having a mean diameter of 192.9 nm, or within a population of nanoparticles having a mean diameter of 176.5 nm.

Yet a further embodiment is a modified water in oil (reverse phase) evaporation method for making a liposome nanoparticle with high vancomycin loading, the method including: dissolving in a 1:1 mixture of diethyl ether:chloroform:HSPC:cholesterol:DSPE-mPEG in a 1:0.5:0.07 ratio (w/w), or HSPC:cholesterol:DSPE-mPEG:DSPE-PEG-Folate in a 1:0.05:0.007:0.007 ratio (w/w), or DOTAP:cholesterol:DSPE-mPEG in a 1:0.5:0.07 ratio (w/w); evaporating the organic phase to obtain a thin film of lipid mixture; re-dissolving the resulting thin film in the same organic phase at the same ratio and adding an equal volume of sterile PBS to form an emulsion; breaking the emulsion by high energy cavitation produced using a sonicator; evaporating the organic phase to obtain a clear liposomal solution; separating unencapsulated vancomycin from the clear liposomal solution by gel column filtration; and size-extruding at 60° C. through 200 nm and 100 nm membranes. Examples of such methods further include subjecting the clear liposomal solution to multiple freeze-thaw cycles (for instance, at least 2, at least 3, at least 4, at least 5, at least 6, at least 7, at least 8, at least 9, at least 10, at least 12, at least 15, or more freeze-thaw cycles).

Also provided are methods of forming a nanoparticle disclosed herein utilizing water in oil emulsion, reverse phase evaporation. For instance, in representative examples of such a method the nanoparticle encapsulates vancomycin, cefazolin, or a mixture of vancomycin and cefazolin.

This disclosure also includes nanoparticles prepared using any method described herein. By way of example, nanoparticle so produced in some embodiments include at least 10% (w/w) vancomycin, at least 10% (w/w) cefazolin, or at least 10% (w/w) of a mixture of vancomycin and cefazolin.

In particular embodiments, a ratio of lipid:therapeutic agent is 50% cefazolin, 50% lipid (i.e., 1:1); and 10% vancomycin, 90% lipid (i.e., 1:10) (for liposomes with single antibiotic formulation). See U.S. Pat. No. 5,415,867 ("High ratio active agent:lipid complex). In particular embodiments, a ratio of HSPC:Cholesterol:DSPE-mPEG in the lipid portion of a liposome is 1:0.5:0.07, respectively. In other embodiments, the lipid portion of a liposome is HSPC:Cholesterol:DSPE-mPEG:DSPE-PEG-Folate were 1:0.05:0.007:0.007; or a 1:0.5:0.07 ratio of DOTAP to cholesterol to DSPE-mPEG.

In particular embodiments, vancomycin serves as an anti-inflammatory agent and cefazolin as an anti-bacterial agent.

Also provided are liposomes including cefazolin in combination with one or more other antibiotic or anti-inflammatory agent(s).

Also provided are methods of reducing nephrotoxicity, which involve using possibly nephrotoxic compounds (e.g., drugs) in an encapsulated format, such as a liposomal formulation containing a combination of vancomycin and cefazolin. The combination can be provided within individual liposomes (that is, with two therapeutic compounds mixed inside of individual liposomes); or as a mixture of liposomes, some of which contain one therapeutic compound and others of which contain another (or a mixture of compounds).

In particular embodiments, a single composition includes an x:y ratio (as described herein) of the individual liposomal formulations of vancomycin and cefazolin. Methods of treatment involving applying such a composition to a subject are provided.

In particular embodiments, a single composition includes vancomycin and cefazolin in the ratio x:y (as described herein) in a single liposome. Methods of treatment involving applying such a composition to a subject are provided.

The particle size of the liposome including a combination of the drug can be defined; in this regard, the range of liposome particle size can be set as a criteria to modify the pharmacokinetics, localization of liposome in infectious sites, and reduction in nephrotoxicity of the passenger antibiotic (such as vancomycin).

Additional embodiments provide a method of treatment specific for MRSA, using a combination of vancomycin and cefazolin. Such methods involve, for instance, application (administration) to a subject of a liposome composition including vancomycin and a beta lactam antibiotic (such as cefazolin). By way of example, such a composition may be administered by injection, topically, or from a slow-release deposit.

In particular embodiments, an x:y ratio of individual formulations is 1:10; 2:10; 3:10; 4:10; 5:10; 6:10; 7:10; 8:10; 9:10; 10:10; 11:10; 12:10; 13:10; 14:10; 15:10; 16:10; 17:10; 18:10; 19:10; or 20:10, or any other ratio.

Also provided are uses of an antibiotic chemically conjugated with a lipid molecule as an active component of a therapeutic liposome, to improve the stability and long circulation of the antibiotic, substantially as described herein. Methods of chemical conjugation of antibiotics with the lipid molecules are described, as are methods of using them as active component of liposome (for instance, to improve the stability and long circulation of antibiotics).

Yet a further embodiment are liposomes, in the hydrophilic core of which are captured one or more oligomicelles (OMs) that include at least one conjugated or encapsulated antibiotic, substantially as described herein. Development of such antibiotic-conjugated or antibiotic encapsulated OMs that will be further loaded into the hydrophilic core of the liposomes is also provided.

Particular embodiments include vancomycin as the only therapeutic compound. Other particular embodiments include cefazolin as the only therapeutic compound. Particular embodiments include liposomal vancomycin. Particular embodiments include liposomal (encapsulated) cefazolin.

Particular embodiments include: 1. liposomal, nanoparticle, or other drug delivery system for vancomycin or cefazolin alone; 2. liposomal, nanoparticle, or other drug delivery system including a combination of vancomycin and cefazolin; 3. both the vancomycin and cefazolin loaded within one liposome, nanoparticle, other drug delivery system.

Particular embodiments can utilize the antibiotics colistin (polymyxin E) and other polymyxins. These agents are used to treat resistant gram-negative bacteria. Colistin and polymyxin can be used alone, or in various and all combinations with vancomycin and/or cefazolin and/or in combination with any other antibiotic disclosed herein or known to those of ordinary skill in the art.

Aspects of the current disclosure are now described in more detail. The description is organized into the following sections: (i) Liposome Nanoparticles; (ii) Targeting Ligand (s); (iii) Formulations; (iv) Methods of Treatment; and (iv) Kits.

Figure 11:
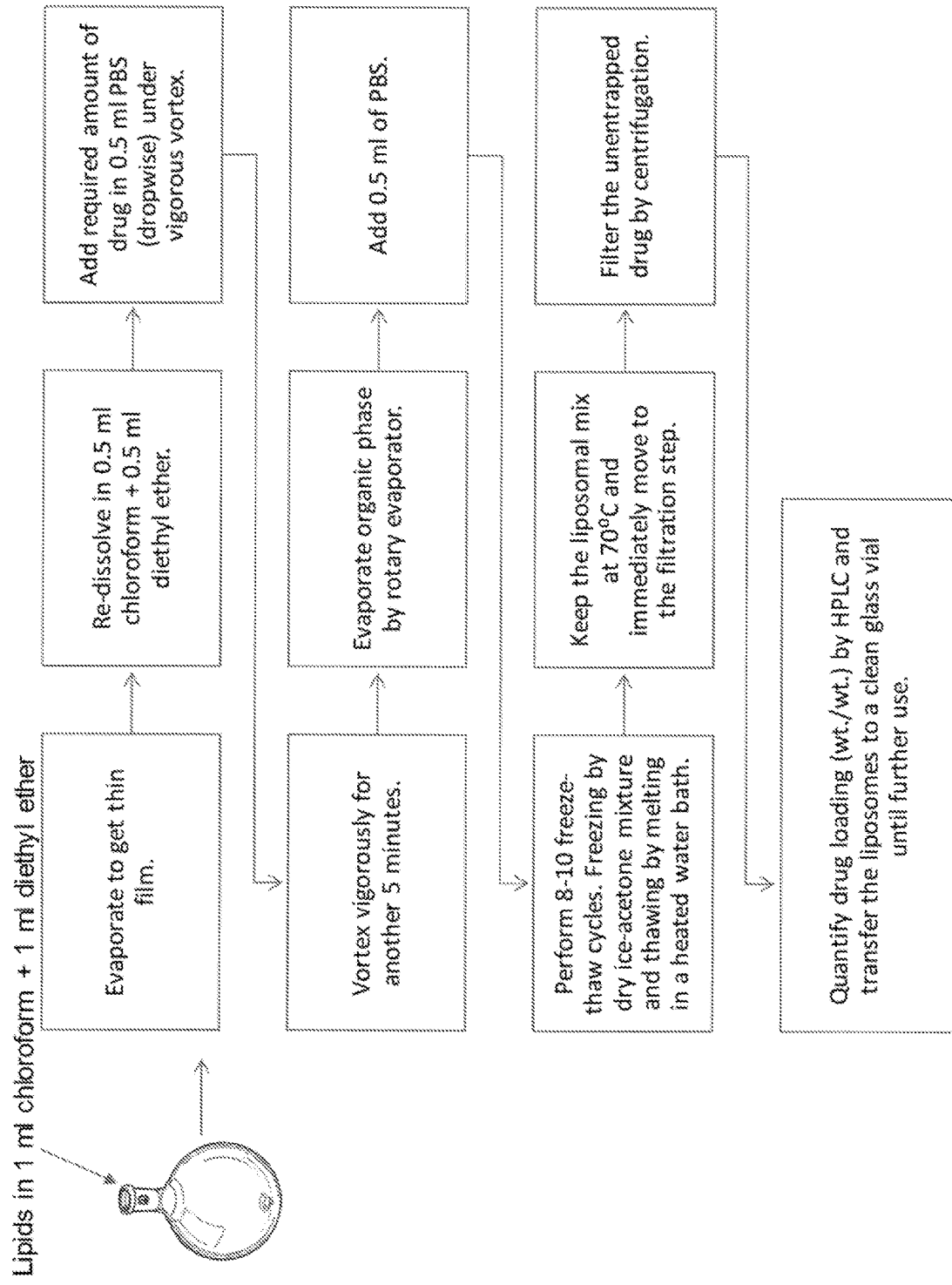
FIG. 11 shows a representative method (scheme) for preparation of liposomes, such as VAN and CFZ liposomes.
Figure 12A:
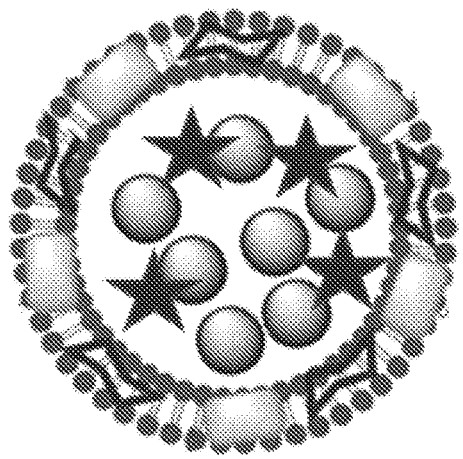
FIG. 12A-12C are schematic representations of nano-antibiotic liposome embodiments in which is encapsulated.
Figure 12A:
Figure 12A:
Figure 12B:
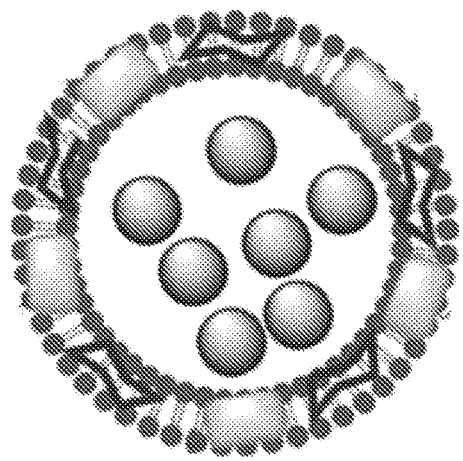
Figure 12C:
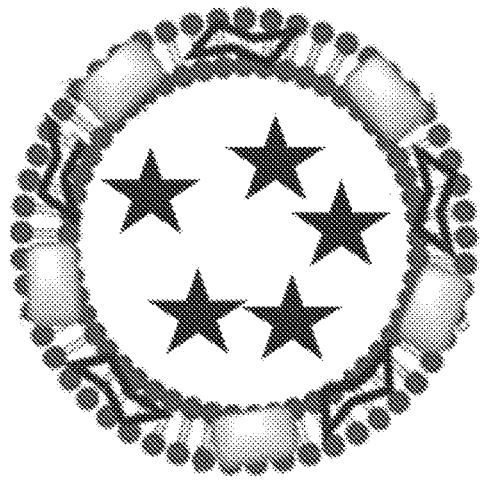

(i) Liposome Nanoparticles:Described herein is the preparation and characterization of liposome which encapsulate very high loads of one or more therapeutic compounds. In specific embodiments, the liposome nanoparticles encapsulate vancomycin, cefazolin, or a mixture of vancomycin and cefazolin. These liposomes are prepared using a modified reverse phase (water in oil) evaporation method, as described in Example 1; see also FIG. 11. In some embodiments, the lipid phase contains HSPC:Cholesterol:DSPE-mPEG in the ratio 1:0.5:0.07 dissolved in a 1:1 mixture of diethyl ether:chloroform. In other embodiments, the lipid phase contains HSPC:Cholesterol:DSPE-mPEG:DSPE-PEG-Folate in the ratio of 1:0.05:0.007:0.007; or a 1:0.5:0.07 ratio of DOTAP to cholesterol to DSPE-mPEG.

The organic phase is evaporated to get a thin film of the lipid mixture. The resulting thin film is re-dissolved in the same organic phase at the same ratio, to which an equal volume of sterile PBS is added, forming an emulsion. The emulsion is broken by high energy cavitation produced by a bath sonicator, followed by evaporation of the organic phase until a clear liposomal solution was obtained. The liposomal solution is further subjected to multiple (for instance, at least 4, at least 5, at least 6, at least 7, at least 8, or more, such as 8-10 or more) freeze-thaw cycles to enhance drug loading. Each cycle of the freeze-thaw method involves heating the liposomal solution at 70° C. in water bath, followed by immediate freezing in dry ice-acetone mixture, and finally quick thawing by heating again at 70° C. Unencapsulated drug is separated from the resultant liposome composition by gel column filtration (for instance, using Superdex 200 Gel Filtration Columns, Sigma-Aldrich, USA), followed by size-extrusion at 60° C. through 200 nm and 100 nm membranes. Vancomycin and cefazolin liposomes thus formed, as well as liposomes contain a mixture of these two compounds, have been evaluated for their physicochemical and biological characterization, as described below.

Though specific useful lipid compositions are described herein the, the liposomes and lipid nanoparticles of the present disclosure can contain any suitable lipid, including cationic lipids, zwitterionic lipids, neutral lipids, or anionic lipids as described above. Suitable lipids can include fats, waxes, steroids, cholesterol, fat-soluble vitamins, monoglycerides, diglycerides, phospholipids, sphingolipids, glycolipids, cationic or anionic lipids, derivatized lipids, and the like.

Suitable phospholipids include but are not limited to phosphatidylcholine (PC), phosphatidic acid (PA), phosphatidylethanolamine (PE), phosphatidylglycerol (PG), phosphatidylserine (PS), and phosphatidylinositol (PI), dimyristoyl phosphatidyl choline (DMPC), distearoyl phosphatidyl choline (DSPC), dioleoyl phosphatidyl choline (DOPC), dipalmitoyl phosphatidyl choline (DPPC), dimyristoyl phosphatidyl glycerol (DMPG), distearoyl phosphatidyl glycerol (DSPG), dioleoyl phosphatidyl glycerol (DOPG), dipalmitoyl phosphatidyl glycerol (DPPG), dimyristoyl phosphatidyl serine (DMPS), distearoyl phosphatidyl serine (DSPS), dioleoyl phosphatidyl serine (DOPS), dipalmitoyl phosphatidyl serine (DPPS), dioleoyl phosphatidyl ethanolamine (DOPE), palmitoyloleoylphosphatidylcholine (POPC), palmitoyloleoyl-phosphatidylethanolamine (POPE) and dioleoyl-phosphatidylethanolamine 4-(N-maleimidomethyl)-cyclohexane-1-carboxylate (DOPE-mal), dipalmitoyl phosphatidyl ethanolamine (DPPE), dimyristoylphosphoethanolamine (DMPE), distearoyl-phosphatidyl-ethanolamine (DSPE), 16-O-monomethyl PE, 16-O-dimethyl PE, 18-1-trans PE, 1-stearoyl-2-oleoyl-phosphatidyethanolamine (SOPE), 1,2-dielaidoyl-sn-glycero-3-phophoethanolamine (transDOPE), and cardiolipin. Lipid extracts, such as egg PC, heart extract, brain extract, liver extract, and soy PC, are also useful. In some embodiments, soy PC can include Hydro Soy PC (HSPC). In certain embodiments, the lipids can include derivatized lipids, such as PEGylated lipids. Derivatized lipids can include, for example, DSPE-PEG2000, cholesterol-PEG2000, DSPE-polyglycerol, or other derivatives generally known in the art.

Liposomes and lipid nanoparticles of the present disclosure may contain steroids, characterized by the presence of a fused, tetracyclic gonane ring system. Examples of steroids include, but are not limited to, cholesterol, cholic acid, progesterone, cortisone, aldosterone, estradiol, testosterone, dehydroepiandrosterone. Synthetic steroids and derivatives thereof are also contemplated for use in methods and compositions of the present disclosure.

Cationic lipids contain positively charged functional groups under physiological conditions. Cationic lipids include, but are not limited to, N,N-dioleyl-N,N-dimethylammonium chloride (DODAC), N,N-distearyl-N,N-dimethylammonium bromide (DDAB), N-(1-(2,3-dioleoyloxy)propyl)-N,N,N-trimethylammonium chloride (DOTAP), N-(1-(2,3-dioleyloxy)propyl)-N,N,N-trimethylammonium chloride (DOTMA), N-[(1-(2,3,-ditetradecyloxy)propyl]-N,N-dimethyl-N-hydroxyethylammonium bromide (DMRIE), N[1-(2,3, dioleyloxy)propyl]-N,N-dimethyl-N-hydroxy ethylammonium bromide (DORIE), 3β-[N-(N',N'-dimethylaminoethane) carbamoyl]cholesterol (DC-Chol), dimethyldioctadecylammonium (DDAB) and N,N-dimethyl-2,3-dioleyloxy)propylamine (DODMA).

Any suitable combination of lipids can be used to provide the liposomes and lipid nanoparticles of the disclosure. The lipid compositions can be tailored to affect characteristics such as leakage rates, stability, particle size, zeta potential, protein binding, in vivo circulation, and/or accumulation in tissues or organs. For example, DSPC and/or cholesterol can be used to decrease leakage from liposomes. Negatively or positively lipids, such as DSPG and/or DOTAP, can be included to affect the surface charge of a liposome or lipid nanoparticle. In some embodiments, the lipid compositions can include ten or fewer types of lipids, or five or fewer types of lipids, or three or fewer types of lipids. In some embodiments, the molar percentage (mol %) of a specific type of lipid present typically includes from 0% to 10%, from 10% to 30%, from 30% to 50%, from 50% to 70%, from 70% to 90%, from 90% to 100% of the total lipid present in a liposome or lipid nanoparticle.

The lipid nanoparticles of the present disclosure can contain surfactants including non-ionic surfactants, some of which can act as triggering agents to facilitate release of the therapeutic liposome's cargo. Examples of non-ionic surfactants include, but are not limited to, ethoxylated alkylphenols, ethoxylated fatty esters, sorbitan derivatives, and tocopherol derivatives. Surfactants contemplated for use in the present disclosure include D-α-tocopherol polyethylene glycol succinate (TPGS), which is available having different polyethylene glycol sizes. Also contemplated are embodiments that use one or more of cyclodextrins, block co-polymer, and/or amphiphilic polymers. Other useful non-ionic surfactants include: polyethylene glycol p-(1,1,3,3-tetramethylbutyl)-phenyl ether, polyoxyethylene (2) isooctylphenyl ether, polyoxyethylene (150) dinonylphenyl ether, dodecanoic acid 2,3-dihydroxypropyl ester, polyoxyethylene (20) sorbitan monolaurate, polyoxyethylene (20) sorbitan monopalmitate, polyoxyethylene (20) sorbitan monostearate, polyoxyethylene (20) sorbitan monooleate, and the like.

Also specifically contemplated are embodiments in which a targeting ligand or antibiotics is chemically conjugated with lipid molecule(s) of the liposomes. That targeting ligand or antibiotic modified lipid can be used for liposome preparation to improve the stability and long circulation of antibiotics.

The term "liposome" encompasses any compartment enclosed by a lipid bilayer. The term liposome includes unilamellar vesicles which are composed of a single lipid bilayer and generally have a diameter in the range of 20 to 400 nm. Liposomes can also be multilamellar, which generally have a diameter in the range of 1 to 10 μm. In some embodiments, liposomes can include multilamellar vesicles (MLV), large unilamellar vesicles (LUV), and small unilamellar vesicles (SUV); mixtures are also contemplated. MLVs are liposomes that contain multiple lipid bilayers, forming two or more shells; see Shek et al. (*Immunology* 49:37-44, 1983).

"Micelle" refers to an aggregate of amphiphilic molecules such as lipids, assembled to form a particle with a hydrophobic interior and a hydrophilic exterior. Micelles are generally spherical assemblies with diameters below 100 nm, although a range of micelle diameters and varying micelle shapes, such as discoid micelles, are known in the art.

As used herein, the term "lipid" refers to lipid molecules that can include fats, waxes, steroids, cholesterol, fat-soluble vitamins, monoglycerides, diglycerides, phospholipids, sphingolipids, glycolipids, cationic or anionic lipids, derivatized lipids, and the like, as described in detail below. Lipids can form micelles, monolayers, and bilayer membranes. The lipids can self-assemble into liposomes.

As used herein, the terms "molar percentage" and "mol %" refer to the number of a moles of a given lipid or other component of a liposome divided by the total number of moles of all lipid or other components. Unless explicitly stated, the amounts of active agents, diluents, or other components are not included when calculating the mol % for a lipid or surfactant component of a liposome.

(ii) Targeting Ligand(s): Particular embodiments of the nanoparticles include one or more targeting ligands to provide for more selective delivery to, and/or accumulation at, infection sites. For example, particular embodiments can include leucocyte, fibroblast, neutrophils, or lymphocytes (T-cell, B-cell) targeting ligands (Hanke et al., *J. Immunol.* 190:2159-2168, 2013). This can be done by exploiting the folate receptor beta (FRβ), toll-like receptor (TLR), hyaluronan receptor (CD44), T cell receptor (TCR) of immune cells, and protein A receptor on surface of *S. aureus* (Shen et al., *J. Leukoc. Biol.* 96:563-570, 2014; Liu, *Pediatr Res.* 65:71-77, 2009). The FR receptor can be targeted with folic acid; TLR can be targeted with lipopeptides, lipoprotein, small oligonucleotide sequence; CD44 can be targeted with hyaluronic acid (HA); fibroblast activation protein (FAP) of wound fibroblast cells can be targeted by linagliptin, and other xanthine scaffold (Jansen et al., *Med. Chem. Commun.* 5:1700-1707, 2014); and protein A receptor can be targeted by specific antibody. Such targeting ligand(s) can be conjugated to the liposome encapsulated with a combination of antibiotics.

Particular embodiments can include carbonic anhydrase (CA) enzyme subtypes targeting ligands. CA-ligands, such as acetazolamide and other sulfonamide and sulfamates derivatives, such as acetazolamide; methazolamide; ethoxzolamide; dichlorophenamide; dorzolamide; brinzolamide; benzolamide; topiramate; zonisamide; sulpiride; indisulam; celecoxib; valdecoxib; as well as antibody(s) and/or peptides that have high affinity for CA enzymes (Supuran, *Front. Pharmacol.* JUL, 2011; doi:10.3389/fphar.2011.00034). In particular embodiments, the current disclosure provides use of CA-ligand tagged liposomes for selective and targeted delivery of encapsulated compounds (such as vancomycin and/or cefazolin) to sites of *S. aureus* infection in a subject. Particular embodiments of nanoparticles disclosed herein include both leucocyte targeting ligand(s) and CA enzyme targeting ligand(s).

Accumulation (or accumulated) in this context refers to liposomes that have amassed at a given site in a subject after administration, having ceased to systemically circulate within the subject. In some embodiments, the accumulation may be due to binding of a specific biomarker at the target site by a liposome including a ligand that recognizes the biomarker. In some cases, the liposome accumulation may be due to the enhanced permeability and retention characteristics of certain tissues such as cancer tissues. Liposome accumulation may be assessed by any suitable means, such as compartmental analysis of test subjects or non-invasive techniques such as single photon emission computer tomography (SPECT), positron emission tomography (PET) or nuclear magnetic resonance imaging (NMR/MRI). However, one of skill in the art can plan the timing of liposome administration to a particular subject so as to allow for sufficient accumulation at a target site without directly measuring accumulation in the subject. Exemplary methods are described in the Examples.

(iii) Formulations: Nanoparticles (including antibiotic-encapsulated liposomes) can be provided as part of compositions formulated for administration to subjects. In particular embodiments, antibiotics are provided as part of a composition that includes, for example, at least 10% w/w of antibiotics (vancomycin, cefazolin (or another beta-lactam antibiotic), colistin, and/or polymyxin alone or in combination); at least 20% w/w of antibiotics (vancomycin, cefazolin (or another beta-lactam antibiotic), colistin, and/or polymyxin, alone or in combination); at least 30% w/w of antibiotics (vancomycin, cefazolin (or another beta-lactam antibiotic), colistin, and/or polymyxin, alone or in combination); at least 40% w/w of antibiotics (vancomycin, cefazolin (or another beta-lactam antibiotic), colistin, and/or polymyxin, alone or in combination); or at least 50% w/w of antibiotics (vancomycin, cefazolin (or another beta-lactam antibiotic), colistin, and/or polymyxin, alone or in combination).

The compositions can be formulated for administration by, for example, injection, inhalation, infusion, perfusion, lavage, ingestion, or topical administration. For injection, compositions can be formulated as aqueous solutions, such as in buffers including Hanks' solution, Ringer's solution, or physiological saline. For oral administration, the compositions can be formulated as tablets, pills, capsules, liquids, gels, syrups, slurries, suspensions and the like.

In particular embodiments, the compositions can be applied as topical agents (e.g., gels, ointments, pastes, creams, lotions, sprays, powders, or salves), by subcutaneous or sub-dermal injections and/or as additives to wound dressings.

The gels, ointments, pastes, creams, lotions, sprays, powders, or salves may contain, in addition to compositions of the disclosure, excipients, such as animal and vegetable fats, oils, waxes, paraffins, starch, tragacanth, cellulose derivatives, polyethylene glycols, silicones, bentonites, silicic acid, talc and zinc oxide, or mixtures thereof. Powders and sprays particularly may benefit from the inclusion of excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane. The compositions of the disclosure can be alternatively administered by aerosol. This is accomplished by preparing an aqueous aerosol, liposomal preparation or solid particles containing a composition of the disclosure. A non-aqueous (e.g., fluorocarbon propellant) suspension could be used. Sonic nebulizers can be preferred because they minimize exposing the compositions to shear, which can result in degradation of the composition.

Ordinarily, an aqueous aerosol is made by formulating an aqueous solution or suspension of the composition together with conventional pharmaceutically-acceptable carriers and stabilizers. The carriers and stabilizers vary with the requirements of the particular composition, but typically include nonionic surfactants (Tweens, Pluronics, or polyethylene glycol), innocuous proteins like serum albumin, sorbitan esters, oleic acid, lecithin, amino acids such as glycine, buffers, salts, sugars or sugar alcohols. Aerosols generally are prepared from isotonic solutions.

Compositions can also be formulated as depot preparations. Depot preparations can be formulated with suitable polymeric or hydrophobic materials (for example as an emulsion in an acceptable oil) or ion exchange resins, or as sparingly soluble derivatives, for example, as a sparingly soluble salts.

Additionally, compositions can be formulated as sustained-release systems, for instance utilizing semipermeable matrices of solid polymers containing at least one active ingredient. Various sustained-release materials have been established and are well known by those of ordinary skill in the art. Such sustained-release systems include multivesicular liposomes and nanogels. Sustained-release systems may, depending on their chemical nature, release active ingredients following administration for a few weeks up to over 100 days.

Compositions can also be incorporated into transdermal patches and/or wound dressings. Generally, in these embodiments, compositions are embedded within puffs, gauzes, fleeces, gels, powders, sponges or other materials that are associated with a second layer to form an adhesive transdermal patch or wound dressing. Absorption enhancers can also be used to increase the flux of the composition across the skin. The rate of such flux can be controlled by either providing a rate controlling membrane or dispersing the composition in a polymer matrix or gel.

In particular embodiments, the second layer of transdermal patch or wound dressing a can be, without limitation, an elastomeric layer, vapor-permeable film, waterproof film, a woven or nonwoven fabric, mesh, or the like. The composition-containing and second layers can be bonded using any suitable method (e.g., the application of adhesives, such as pressure sensitive adhesives, hot melt adhesives, curable adhesives; the application of heat or pressure, such as in lamination, a physical attachment through the use of stitching, studs, other fasteners; or the like).

Although any adhesive suitable for forming a bond with the skin or other tissue can be used, in certain embodiments a pressure sensitive adhesive is used. Pressure sensitive adhesives are generally defined as adhesives that adhere to a substrate when a light pressure is applied but leave little to no residue when removed. Pressure sensitive adhesives include solvent in solution adhesives, hot melt adhesives, aqueous emulsion adhesives, calenderable adhesives, and radiation curable adhesives.

The most commonly used elastomers in pressure sensitive adhesives can include natural rubbers, styrene-butadiene latexes, polyisobutylene, butyl rubbers, acrylics, and silicones. In particular embodiments, acrylic polymer or silicone-based pressure sensitive adhesives can be used. Acrylic polymers can often have a low level of allergenicity, be cleanly removable from skin, possess a low odor, and exhibit low rates of mechanical and chemical irritation. Medical grade silicone pressure sensitive adhesives can be chosen for their biocompatibility.

Amongst the factors that influence the suitability for a pressure sensitive adhesive for use in wound dressings of particular embodiments is the absence of skin irritating components, sufficient cohesive strength such that the adhesive can be cleanly removed from the skin, ability to accommodate skin movement without excessive mechanical skin irritation, and good resistance to body fluids.

In particular embodiments, the pressure sensitive adhesive can include a butyl acrylate. While butyl acrylate pressure sensitive adhesives can generally be used for many applications, any pressure sensitive adhesive suitable for bonding skin can be used. Such pressure sensitive adhesives are well known in the art.

Any composition formulation disclosed herein can advantageously include any other pharmaceutically acceptable carriers which include those that do not produce significantly adverse, allergic or other untoward reactions that outweigh the benefit of administration, whether for research, prophylactic and/or therapeutic treatments. Exemplary pharmaceutically acceptable carriers and formulations are disclosed in Remington's Pharmaceutical Sciences, 18th Ed. Mack Printing Company, 1990. Moreover, formulations can be prepared to meet sterility, pyrogenicity, general safety and purity standards as required by United States FDA Office of Biological Standards and/or other relevant foreign regulatory agencies.

Exemplary generally used pharmaceutically acceptable carriers include any and all bulking agents or fillers, solvents or co-solvents, dispersion media, coatings, surfactants, antioxidants (e.g., ascorbic acid, methionine, vitamin E), preservatives, isotonic agents, absorption delaying agents, salts, stabilizers, buffering agents, chelating agents (e.g., EDTA), gels, binders, disintegration agents, and/or lubricants.

Once formed, the compositions can be administered to subjects. Subjects include human subjects, veterinary animals (dogs, cats, reptiles, birds, etc. and also including animals found within zoos), livestock (horses, cattle, goats, pigs, chickens, etc.), and research animals (monkeys, rats, mice, fish, etc.).

(iv) Methods of Treatment: Therapeutic treatments include reducing or eliminating the presence of an existing infection. Prophylactic treatments prevent or reduce the occurrence or severity of, or slow down or lessen the development of an infection. The compositions can be administered prophylactically in subjects who are at risk of developing an infection or an antibiotic-resistant form of an infection.

The terms "administer," "administered," and "administering" refer to methods of administering a liposome composition to a subject. The liposome compositions can be administered in a variety of ways, including colonically, intradermally, intramuscularly, intraperitoneally, intravenously, parenterally, rectally, or topically. The liposome compositions can also be administered as part of a composition or formulation, and optionally along with one or more additional active (e.g., therapeutic) compounds.

Treatments can provide an anti-infection effect. Anti-infection effects can reduce the number of cells that become infected, increase the time before cells become infected, prevent a higher level of infection, decrease the number of infected cells, decrease the volume of infected tissue, increase life expectancy, induce sensitivity of infected cells to immune clearance, reduce infection-associated pain, and/or prevent, reduce, delay, or eliminate a symptom associated with the treated infection.

Therapeutically effective amounts provide therapeutic treatments and/or prophylactic treatments. Therapeutically effective amounts as well as dosing regimens can be determined by an attending physician or veterinarian, considering various factors such as the age, condition, the severity of infection, type of infection, resistance of infection to treatments, time of administration, and other clinical factors.

Multivesicular liposome (MVL) preparations and/or nanogels can be applied topically or injected in situ at the area of infections. Due to sustained antibiotics releasing property, MVL and nanogels can stay at the site of injection/infections for a few weeks to months, necessitating less frequent administration. Thus, patients do not need to visit the clinic for frequent injection, instead they can get the dose once and stay home for several weeks. This particularly benefits patients with needle phobias. MVL can be microparticles in the size range of 0.5-5 µm.

The compositions described herein can also be administered with other anti-infective agents such as anthelmintics (mebendazole), antibiotics including aminoclycosides (gentamicin, neomycin, tobramycin), antifungal antibiotics (amphotericin b, fluconazole, griseofulvin, itraconazole, ketoconazole, nystatin, micatin, tolnaftate), cephalosporins (cefaclor, cefotaxime, ceftazidime, ceftriaxone, cefuroxime, cephalexin), beta-lactam antibiotics (cefazolin, cephapirin, cefaclor, cephaloridine, cephoxazole, cefoxitin cefotetan, cephaloridine, cephradine, cephlexin, cephaloglycine, cefuroxime, cefmenoxime, cephalothin, and meropenem, and analogues and derivatives thereof), chloramphenicol, macrolides (azithromycin, clarithromycin, erythromycin), penicillins (penicillin G sodium salt, amoxicillin, ampicillin, dicloxacillin, nafcillin, piperacillin, ticarcillin), tetracyclines (doxycycline, minocycline, tetracycline), bacitracin, clindamycin, colistimethate sodium, polymyxin b sulfate, antivirals including acyclovir, amantadine, didanosine, efavirenz, foscarnet, ganciclovir, indinavir, lamivudine, nelfinavir, ritonavir, saquinavir, stavudine, valacyclovir, valganciclovir, zidovudine, quinolones (ciprofloxacin, levofloxacin), sulfonamides (sulfadiazine, sulfisoxazole), sulfones (dapsone), furazolidone, metronidazole, pentamidine, lipopeptides group antibiotics, Daptomycin, Ansamycins group antibiotics, Rifamycin, sulfanilamidum crystallinum, gatifloxacin, and sulfamethoxazole/trimethoprim. In particular embodiments, vancomycin can be replaced with an antibiotic disclosed within this paragraph. In particular embodiments, cefazolin can be replaced with an antibiotic disclosed within this paragraph.

Compositions can also be administered with anesthetics such as ethanol, bupivacaine, chloroprocaine, levobupivacaine, lidocaine, mepivacaine, procaine, ropivacaine, tetracaine, desflurane, isoflurane, ketamine, propofol, sevoflurane, codeine, fentanyl, hydromorphone, marcaine, meperidine, methadone, morphine, oxycodone, remifentanil, sufentanil, butorphanol, nalbuphine, tramadol, benzocaine, dibucaine, ethyl chloride, xylocaine, and phenazopyridine.

(v) Kits: Also provided herein are kits. As used herein, the term "kit" refers to a set of two or more components necessary for employing a method as described herein. Kit components can include, but are not limited to, liposomes of the present invention, reagents, buffers, containers and/or equipment. Active component(s), including particularly at least one liposome loaded with at least one therapeutic compound, can be provided as kits. Specifically contemplated are kits that include liposomes loaded with (continuing) vancomycin and cefazolin, whether those two therapeutic agents are provided in the same liposomes or as a preparation of liposomes, some of which contain each therapeutic agent.

Disclosed kits include material(s) and reagent(s) useful in the administration of a therapeutic liposomal composition to a subject to treat a diseases or condition (such as an infection). The materials and reagents can include those necessary to administer any of the therapeutic compositions disclosed herein according to any method described herein and/or known to one of ordinary skill in the art.

Kits can include one or more containers including one or more or more compounds as described herein, optionally along with one or more agents for use in therapy. For instance, some kits will include an amount of at least one anti-inflammatory component.

Any active component in a kit may be provided in premeasured dosages, though this is not required; and it is anticipated that certain kits will include more than one dose.

Kits can also include a notice in the form prescribed by a governmental agency regulating the manufacture, use, or sale of pharmaceuticals or biological products, which notice reflects approval by the agency of manufacture, use, or sale for human administration. The notice may state that the provided active ingredients can be administered to a subject. The kits can include further instructions for using the kit, for example, instructions regarding administration; proper disposal of related waste; and the like. The instructions can be in the form of printed instructions provided within the kit or the instructions can be printed on a portion of the kit itself. Instructions may be in the form of a sheet, pamphlet, brochure, CD-ROM, or computer-readable device, or can provide directions to instructions at a remote location, such as a website. In particular embodiments, kits can also include some or all of the necessary medical supplies needed to use the kit effectively, such as applicators, ampules, sponges, sterile adhesive strips, Chloraprep, gloves, and the like. Variations in contents of any of the kits described herein can be made. The instructions of the kit will direct use of the active ingredient(s) included in that kit to effectuate a clinical and/or therapeutic use described herein.

The Exemplary Embodiments and Examples below are included to demonstrate particular embodiments of the disclosure. Those of ordinary skill in the art should recognize in light of the present disclosure that many changes can be made to the specific embodiments disclosed herein and still obtain a like or similar result without departing from the spirit and scope of the disclosure.

Exemplary Embodiments

1. A method of treating *Staphylococcus* (*S.*) *aureus* infection in a subject in need thereof, including administering to the subject a therapeutically effective amount of a liposomal nanoparticle including: a lipid component including a 1:0.5:0.07 ratio of HSPC to cholesterol to DSPE-mPEG, or a 1:0.05:0.007:0.007 ratio of HSPC to cholesterol to DSPE-mPEG to DSPE-PEG-Folate; or a 1:0.5:0.07 ratio of DOTAP to cholesterol to DSPE-mPEG; at least 10% vancomycin; and cefazolin, thereby treating *S. aureus* infection in the subject.

2. The method of embodiment 1, wherein the liposomal nanoparticle was made using a modified water in oil (reverse phase) evaporation method described herein.

3. A method of treating *Staphylococcus* (*S.*) *aureus* infection in a subject in need thereof, including administering a therapeutically effective amount of a drug delivery system including vancomycin and cefazolin to the subject thereby treating *S. aureus* infection in the subject.

4. The method of embodiment 3 (or any of the other method embodiments), wherein the *S. aureus* infection is a Methicillin-Resistant *Staphylococcus aureus* (MRSA) infection or a Methicillin-Susceptible *S. aureus* (MSSA) infection.

5. The method of embodiment 3 (or any of the other method embodiments), wherein the drug delivery system includes a liposomal nanoparticle including: a lipid component including HSPC, Cholesterol, and DSPE-m PEG; and vancomycin, cefazolin, or a mixture thereof.

6. The method of embodiment 3 (or any of the other method embodiments), wherein drug delivery system includes one or more of a nanoparticle, a macroparticle, an emulsion, an organogel, a nanogel, an ointment, a cream, a liposome, a multivesicular liposome (MLV), a microsphere, a nanosphere, and/or a detergent.

7. The method of embodiment 3 (or any of the other method embodiments), wherein drug delivery system includes a lipid component including one or more of natural and synthetic phospholipid, sphingolipid, fatty acid modified lipid, cationic lipid, pH sensitive lipid, anionic lipid, neutral lipid, zwitterionic lipid, antigenic lipid, alkyl phosphate lipid, chelator functionalized lipid, glycosylated lipid, antigenic lipid, adhesive lipid, polymerizable lipid, crosslinking lipid, pegylated lipid, functionalized peg lipid, and/or a chemical conjugation to the vancomycin and/or cefazolin.

8. The method of embodiment 7 (or any of the other method embodiments), wherein the drug delivery system includes: one or more of natural or synthetic egg sphingosine, brain sphingosine, sphingosine (d14:1), sphingosine (d16:1), sphingosine (d17:1), sphingosine (d18:1), sphingosine (d20:1), sphingosine 4E,8Z, sphingosine 4E,11Z, 4E,14Z-Sphingadiene, Safingol, sphinganine-1-phosphate (d17:0), (d18:0), (d20:0), (d17:1), (d18:1), (d20:1), methylated sphingosine, phytosphingosine, phosphosphingolipid lipid, and/or glycosphingolipids; and/or one or more of (2S—OH) or (2R—OH) of 12:0, 16:0, 17:0, 18:0, 20:0, 22:0, 24:0, 18:1, or 24:1 Ceramide; or phytoceramide; and/or a cationic lipid including one or more of N1-[2-((1S)-1-[(3-aminopropyl)amino]-4-[di(3-amino-propyl)amino] butylcarboxamido) ethyl]-3,4-di[oleyloxy]-benzamide; 1,2-di-O-octadecenyl-3-trimethylammonium propane; (14:0), (14:1), (16:0), (16:1), (18:0), (18:1), (12:0) 1,2-dimyristoleoyl-sn-glycero-3-ethylphosphocholine; (18:1), (18:0), (16:0), (16:1), (14:0) 1,2-dioleoyl-3-trimethylammonium-propane (DOTAP/TAP); 3β-[N-(N',N'-dimethylaminoethane)-carbamoyl]cholesterol; and/or N4-Cholesteryl-Spermine; and/or a pH sensitive lipid including one or more of 1,2-dioleoyl-3-dimethylammonium-propane; 1,2-dimyristoyl-3-dimethylammonium-propane; 1,2-dipalmitoyl-3-dimethylammonium-propane; 1,2-destearoyl-3-dimethylammonium-propane; or N-(4-carboxybenzyl)-N,N-dimethyl-2,3-bis(oleoyloxy)propan-1-aminium; and/or an anionic lipid including one or more of cholesteryl, hemisuccinate; or Dicetyl phosphate; and/or a neutral lipid including one or more of 1,2-dioctadecanoyl-sn-glycerol; 1-octadecanoyl-2-hexadecanoyl-sn-glycerol; 16:0 ethylene glycol; 1-stearoyl-2-linoleoyl-sn-glycerol; diacyl glycerols; or glycosylated diacyl glycerols; and/or a zwitterionic lipid including one or more of 3-[(3-Cholamidopropyl)dimethylammonio]-1-propanesulfonate; 3-[(3-Cholamidopropyl)dimethylammonio]-2-hydroxy-1-propanesulfonate; N,N-dimethyldodecylamine N-oxide, DOPC, POPC, DLPC, HSPC, DOPE, HSPC, or L-α-hydrogenated phosphatidylcholine; and/or an antigenic lipid including one or more of 1,2-dipalmitoyl-sn-gly dipalmitoyl-sn-glycero-3-phosphoethanolamine-N-(2,4-dinitrophenyl); 1,2-dipalmitoyl-sn-glycero-3-phosphoethanol-amine-N-[6-[(2,4-dinitrophenyl)amino]hexanoyl; or 1,2-Dipalmitoyl-sn-Glycero-3-Phosphoethanolamine-N-(2,4,6-trinitrophenyl); and/or a polymeric, crosslinking lipid or polymerizable lipid including one or more of 1,2-bis(10,12-tricosadiynoyl)-sn-glycero-3-phosphocholine; Chol-PEG(500-5000), DSPE-PEG(500-5000)-OME, DSPE-PEG(500-5000)-SH, DSPE-PEG(500-5000)-NH2, DSPE-PEG(500-5000)-Maliamide, DSPE-PEG(500-5000)-DBCO, DSPE-PEG(500-5000)-Biotin, DSPE-PEG(500-5000)-Azide, DSPE-PEG(500-5000)-carboxylic acid, DSPE-PEG(500-5000)-Succinyl, DSPE-PEG(500-5000)-folate; 1,2-bis(10,12-tricosadiynoyl)-sn-glycero-3-phosphocholine; or C16 PEG750 Ceramide.

9. The method of embodiment 1 (or any of the other method embodiments), wherein the drug delivery system includes a leucocyte, fibroblast, neutrophil, or lymphocyte targeting ligand, or a targeting ligand specific to a bacterial cell or the cell of a host cell associated with a bacterial cell.

10. The method of embodiment 9 (or any of the other method embodiments), wherein the targeting ligand is a folate receptor beta (FRa, 8), a toll-like receptor (TLR), a hyaluronan receptor (CD44), a T cell receptor (TCR) of immune cells, a protein A receptor on the surface of S. aureus, or an the extracellular protein expressed by leukocytes.

11. The method of embodiment 9 (or any of the other method embodiments), wherein the drug delivery system includes one or more of folic acid, methotrexate, aminopterin, antibody, peptides for targeting FR; lipopeptides, lipoprotein, small oligonucleotide sequences for targeting TLR; hyaluronic acid (HA) for targeting CD44; linagliptin, and other xanthine scaffold for targeting fibroblast activation protein (FAP) of wound fibroblast cells;

12. The method of embodiment 9 (or any of the other method embodiments), wherein the leucocyte targeting ligand is folic acid or another folate receptor ligand.

13. The method of embodiment 1 (or any of the other method embodiments), wherein the drug delivery system includes a carbonic anhydrase (CA) targeting ligand.

14. The method of embodiment 13 (or any of the other method embodiments), wherein the CA targeting ligand includes imidazole, sulfoimidazole derivative, acetazolamide; methazolamide; ethoxzolamide; dichorophenamide; dorzolamide; brinzolamide; benzolamide; topiramate; zonisamide; sulpiride; indisulam; celecoxib; valdecoxib; antibody, or a peptide.

15. The method of embodiment 13 (or any of the other method embodiments), wherein the CA targeting ligand is acetazolamide.

16. The method of embodiment 9 (or any of the other method embodiments), wherein the targeting ligand, the vancomycin, and/or the cefazolin is chemically conjugated with lipid molecule(s) of the liposomes.

17. The method of embodiment 1 (or any of the other method embodiments), wherein the treatment is a therapeutic or a prophylactic treatment.

18. The method of embodiment 1 (or any of the other method embodiments), wherein the administering includes injection, oral administration, or topical administration.

19. The method of embodiment 6 (or any of the other method embodiments), wherein the nanoparticle includes a 1:10 ratio of vancomycin to lipid.

20. The method of embodiment 6 (or any of the other method embodiments), wherein the nanoparticle includes a 1:1 ratio of cefazolin to lipid.

21. The method of embodiment 6 (or any of the other method embodiments), wherein the nanoparticle includes a 1:0.5:0.07 ratio of HSPC to cholesterol to DSPE-mPEG.

22. The method of embodiment 6 (or any of the other method embodiments), wherein the nanoparticle includes a 1:0.05:0.007:0.007 ratio of HSPC to cholesterol to DSPE-mPEG to DSPE-PEG-Folate.

23. The method of embodiment 6 (or any of the other method embodiments), wherein the nanoparticle is within a population of nanoparticles having a mean diameter of 192.9 nm, or having a mean diameter of 176.5 nm.

24. The method of embodiment 6 (or any of the other method embodiments), wherein the nanoparticle includes at least 10% vancomycin.

25. The method of embodiment 24, wherein the nanoparticle includes at least 30% vancomycin.

26. A method of reducing the nephrotoxicity associated with therapeutic vancomycin administration to a subject, the method including administering a preparation including a therapeutically effective amount of a lipid nanoparticle including vancomycin and cefazolin to the subject thereby reducing the nephrotoxicity associated with therapeutic vancomycin administration in the subject.

27. The method of embodiment 26 (or any of the other method embodiments), wherein the therapeutic vancomycin administration provides one or more of: a therapeutic treatment in the subject; a prophylactic treatment in the subject; an anti-infection effect against a Methicillin-Resistant *Staphylococcus aureus* (MRSA) infection; and/or an anti-infection effect against a Methicillin-Susceptible *S. aureus* (MSSA) infection.

28. The method of embodiment 26 (or any of the other method embodiments), wherein the lipid nanoparticle includes a leucocyte targeting ligands.

29. The method of embodiment 28 (or any of the other method embodiments), wherein the leucocyte targeting ligand is folic acid.

30. The method of embodiment 26 (or any of the other method embodiments), wherein the lipid nanoparticle includes a carbonic anhydrase (CA) targeting ligand.

31. The method of embodiment 30 (or any of the other method embodiments), wherein the CA targeting ligand is acetazolamide.

32. The method of embodiment 26 (or any of the other method embodiments), wherein the administering is by injection, oral administration, or topical administration.

33. The method of embodiment 26 (or any of the other method embodiments), wherein the nanoparticle includes a 1:10 ratio of vancomycin to lipid.

34. The method of embodiment 26 (or any of the other method embodiments), wherein the nanoparticles includes a 1:1 ratio of cefazolin to lipid.

35. The method of embodiment 26 (or any of the other method embodiments), wherein the nanoparticle includes a 1:5:0.07 ratio of HSPC to cholesterol to DSPE-mPEG.

36. The method of embodiment 26 (or any of the other method embodiments), wherein the nanoparticle includes a 1:0.05:0.007:0.007 ratio of HSPC to cholesterol to DSPE-mPEG to DSPE-PEG-Folate.

37. The method of embodiment 26 (or any of the other method embodiments), wherein the nanoparticle is within a population of nanoparticles having a mean diameter of 192.9 nm.

38. The method of embodiment 26 (or any of the other method embodiments), wherein the nanoparticle is within a population of nanoparticles having a mean diameter of 176.5 nm.

39. A lipid nanoparticle or drug delivery system including at least 10% vancomycin.

40. The lipid nanoparticle or drug delivery system of embodiment 39 (or any other lipid nanoparticle or drug delivery system embodiment) including cefazolin.

41. The lipid nanoparticle or drug delivery system of embodiment 39 (or any other lipid nanoparticle or drug delivery system embodiment) including leucocyte targeting ligands.

42. The lipid nanoparticle or drug delivery system of embodiment 41 (or any other lipid nanoparticle or drug delivery system embodiment), wherein the leucocyte targeting ligand is folic acid.

43. The lipid nanoparticle or drug delivery system of embodiment 39 (or any other lipid nanoparticle or drug delivery system embodiment) including a carbonic anhydrase (CA) targeting ligand.

44. The lipid nanoparticle or drug delivery system of embodiment 43 (or any other lipid nanoparticle or drug delivery system embodiment) including wherein the CA targeting ligand is Acetazolamide.

45. The lipid nanoparticle or drug delivery system of embodiment 39 (or any other lipid nanoparticle or drug delivery system embodiment) formulated for injection, for topical administration, for oral administration, or for use within a transdermal patch or wound dressing.

46. The lipid nanoparticle or drug delivery system of embodiment 39 (or any other lipid nanoparticle or drug delivery system embodiment) including a 1:10 ratio of vancomycin to lipid.

47. The lipid nanoparticle or drug delivery system of embodiment 40 (or any other lipid nanoparticle or drug delivery system embodiment) including a 1:1 ratio of cefazolin to lipid.

48. The lipid nanoparticle or drug delivery system of embodiment 39 (or any other lipid nanoparticle or drug delivery system embodiment) including a 1:0.5:0.07 ratio of HSPC to cholesterol to DSPE-m PEG.

49. The lipid nanoparticle or drug delivery system of embodiment 39 (or any other lipid nanoparticle or drug delivery system embodiment) including a 1:0.05:0.007:0.007 ratio of HSPC to cholesterol to DSPE-mPEG to DSPE-PEG-Folate.

50. The lipid nanoparticle or drug delivery system of embodiment 39 (or any other lipid nanoparticle or drug delivery system embodiment) within a population of nanoparticles having a mean diameter of 192.9 nm.

51. The lipid nanoparticle or drug delivery system of embodiment 39 (or any other lipid nanoparticle or drug delivery system embodiment) within a population of nanoparticles having a mean diameter of 176.5 nm.

52. The lipid nanoparticle or drug delivery system of embodiment 39 (or any other lipid nanoparticle or drug delivery system embodiment), wherein the nanoparticle includes at least 30% vancomycin.

53. A modified water in oil (reverse phase) evaporation method for making a liposome nanoparticle with high vancomycin loading, the method including: dissolving in a 1:1 mixture of diethyl ether:chloroform:HSPC:cholesterol:DSPE-mPEG in a 1:0.5:0.07 ratio (w/w), or HSPC:cholesterol:DSPE-mPEG:DSPE-PEG-Folate in a 1:0.05:0.007:0.007 ratio (w/w), or DOTAP:cholesterol:DSPE-mPEG in a 1:0.5:0.07 ratio (w/w); evaporating the organic phase to obtain a thin film of lipid mixture; re-dissolving the resulting thin film in the same organic phase at the same ratio and adding an equal volume of sterile PBS to form an emulsion; breaking the emulsion by high energy cavitation produced using a sonicator; evaporating the organic phase to obtain a clear liposomal solution; separating unencapsulated vancomycin from the clear liposomal solution by gel column filtration; and size-extruding at 60° C. through 200 nm and 100 nm membranes.

54. The method of embodiment 53, further including subjecting the clear liposomal solution to multiple freeze-thaw cycles.

55. A method of forming a nanoparticle disclosed herein utilizing water in oil emulsion, reverse phase evaporation.

56. The method of embodiment 55, wherein the nanoparticle encapsulates vancomycin, cefazolin, or a mixture of vancomycin and cefazolin.

57. A nanoparticle prepared using the method of any one of embodiments 53-56.

58. The nanoparticle of embodiment 57, including at least 10% (w/w) vancomycin, at least 10% (w/w) cefazolin, or at least 10% (w/w) of a mixture of vancomycin and cefazolin.

59. The method of embodiment 6, wherein the nanoparticle includes a 1:0.5:0.07 ratio of DOTAP to cholesterol to DSPE-mPEG.

60. The method of embodiment 26, wherein the nanoparticle includes a 1:0.5:0.07 ratio of DOTAP to cholesterol to DSPE-mPEG.

61. The lipid nanoparticle or drug delivery system of embodiment 39 including a 1:0.5:0.07 ratio of DOTAP to cholesterol to DSPE-mPEG.

62. Use of an antibiotic chemically conjugated with a lipid molecule as an active component of a therapeutic liposome, to improve the stability and long circulation of the antibiotic, substantially as described herein.

63. Liposomes in the hydrophilic core of which are captured one or more oligomicelles (OMs) including at least one conjugated or encapsulated antibiotic, substantially as described herein.

Example 1

Combination of Vancomycin & Cefazolin Lipid Nanoparticles for Overcoming Antibiotic Resistance of MRSA This Example describes the production and characterization of liposomal preparations loaded with vancomycin or cefazolin that are useful in combatting infections. This study describes the formulation of vancomycin and cefazolin liposomes by reverse phase evaporation method and testing for antimicrobial activity against MRSA strains. Since macrophages are known to infiltrate inflamed and infected tissues, the uptake of dye-loaded liposomes in vitro in a cultured macrophage-like cell line was also studied. Dye-loaded liposomes were also tested for kidney uptake in healthy mice to evaluate their potential impact on nephrotoxicity. Overall, the herein developed formulations, administered alone or in combination, provide a rational approach for combating MRSA. At least some of the work described herein was published as Bhise et al. (*Materials* 11(7), 2018; doi: 10.3390/ma1071245).

Vancomycin is the treatment of choice for infections caused by methicillin-resistant *Staphylococcus aureus* (MRSA). Clinically, combinations of vancomycin (VAN) and beta-lactams have been shown to improve patient outcomes compared to VAN alone for the treatment of MRSA bloodstream infections. However, VAN is known to cause nephrotoxicity, which could be ameliorated using biocompatible lipid drug delivery systems or liposomes. Previous attempts have been made for encapsulation of VAN in liposomes; however, drug loading has been poor (as low as 1%), mainly because of the high aqueous solubility of VAN. In this study, we report a robust method to achieve high loading of VAN and cefazolin (CFZ) in unilamellar liposomes. Liposomes of sizes between 170-198 nm were prepared by modified reverse phase evaporation method and achieved high loading of 40% and 26% (weight/weight) for VAN and CFZ, respectively. Liposomal VAN reduced minimum inhibitory concentration (MIC) values 2-fold in comparison to commercial VAN. The combination of liposomal VAN (LVAN) and liposomal CFZ (LCFZ) demonstrated a 7.9-fold reduction compared to LVAN alone. Rhodamine dye-loaded liposomes demonstrated superior cellular uptake in macrophage-like RAW 264.7 cells. Fluorescent images of LVAN-encapsulating near-infrared (NIR) dye, S0456 (LVAN-S0456) clearly indicated that LVAN-S0456 had reduced renal excretion with very low fluorescent intensity in the kidneys. The long circulation and reduced kidney clearance of LVAN-S0456 compared to VAN-S0456 injected in mice is expected to lead to enhanced efficacy against MRSA infections with reduced nephrotoxicity. Overall, the developed formulations of VAN, when administered alone or in combination with CFZ, provide a rational approach for combating MRSA infections.

Materials. HSPC was purchased from NOF Corporation (Japan). DSPE-mPEG was purchased from Nanocs Inc. (Boston, USA). Cholesterol was purchased from Sigma-Aldrich (USA). Cefazolin drug was purchased from TCI Chemicals (Tokyo, Japan). Vancomycin was purchased from (ACROS Chemical, Thermo Fischer Scientific). Sterile phosphate buffered saline (PBS); pH 7.4 was used for preparing liposomes. All organic solvents were purchased from Acros Organics and were of 99.5% purity. Inoculations of microorganisms were obtained from ATCC. Mueller-Hinton broth (Difco Laboratories, Detroit, MI) was used for all microdilution susceptibility testing and time-kill analyses. Trypticase soy agar (Difco Laboratories) was used for growth and quantification of organisms.

Preparation of Vancomycin and Cefazolin Liposomes. 1 mM and 10 mM liposomes of vancomycin and cefazolin were prepared by modified reverse phase evaporation method (Cortesi et al, *J. Microencapsul.* 16:251-256, 1999). Briefly, a modified water in oil or reverse phase evaporation method was used, with the lipid phase containing HSPC:Cholesterol:DSPE-mPEG in the ratio 1:0.5:0.07 dissolved in a 1:1 mixture of diethyl ether:chloroform. The organic phase was evaporated to get a thin film of the lipid mixture. The resulting thin film was re-dissolved in the same organic phase at the same ratio, to which an equal volume of sterile PBS was added, forming an emulsion. The emulsion was broken by high energy cavitation produced by a bath sonicator, followed by evaporation of the organic phase until a clear liposomal solution was obtained. The liposomal solution was further subjected to 8-10 freeze-thaw cycles to enhance drug loading. Every cycle of the freeze-thaw method required heating the liposomal solution at 70° C. in water bath, followed by immediate freezing in dry ice-acetone mixture, and finally quick thawing by heating again at 70° C. Unencapsulated drug was separated by gel column filtration (Superdex 200 Gel Filtration Columns, Sigma-Aldrich, USA), followed by size-extrusion at 60° C. through 200 nm and 100 nm membranes. Vancomycin and cefazolin liposomes thus formed were evaluated for their physicochemical and biological characterization, as described below.

Evaluation of % drug loading and % encapsulation efficacy. For this study, the liposomal vesicles were disrupted by addition of methanol, and the drug contained within the vesicles was extracted in PBS for quantification by a suitable analytical method (HPLC and UV spectroscopy) at wavelengths of 210 nm and 273 nm for vancomycin and cefazolin respectively. The concentration of drug was extrapolated on vancomycin and cefazolin standard curves and the results were obtained in triplicates. % drug loading and % encapsulation efficacy were calculated by the following formulae:

$$\% \text{ drug loading} = \frac{\text{(Weight of drug contained in the system)}}{\text{(Total weight of the drug loaded liposomal vesicle)}} \times 100$$

% encapsulation efficacy =

$$\frac{\text{(Weight of drug contained in the system)}}{\text{(Total weight of the drug added in the liposome)}} \times 100$$

Analysis of vesicle size by DLS and TEM. Average particle size and polydispersity index was analyzed using Dynamic Light Scattering (DLS, Beckman Coulter Delsa Nano CTM) at ambient temperature. The samples were diluted to 1.5 mL with deionized water. The software used for sample analysis was provided by the manufacturer (Beckman Coulter, Delsa Nano ver. 2.2). The morphology of vancomycin and cefazolin liposomes was studied using Transmission Electron Microscopy (TEM, H-7500, and Hitachi Ltd, Tokyo, Japan). Samples were obtained by placing appropriately diluted nanoparticles onto a carbon-coated 200 mesh copper grid to form a thin film. The film was stained with uranyl acetate, and the excess staining solution was removed with filter paper.

Susceptibility Testing. MICs of vancomycin and cefazolin (commercial drugs and liposomal formulations) both individually and in combination were determined by standardized broth microdilution techniques with a starting inoculum of $5 \times 10^5$ CFU/ml, according to Clinical and Laboratory Standards Institute guidelines, and incubation for 24 h at 35° C. MICs were determined in duplicate, with broth microdilution testing being performed up to an MIC of 64 g/liter for both vancomycin and cefazolin treatments. The strains tested were SA 494 and ATCC 29213.

Time-Kill Analysis. Time-kill assays were performed using liposomal vancomycin and cefazolin alone in and in combination against 29213 and 494 using the lowest of either 0.5×the MIC, or the free peak concentration, for each drug. The same experiment was run using commercial vancomycin and cefazolin. The starting number of cells was $10^5$ CFU/ml. Aliquots of a volume of 0.1 ml were removed from the cultures at time points of 0, 1, 4, 8, and 24 h and were subsequently serially diluted in cold 0.9% sodium chloride. The terms synergy, additivity, antagonism, and indifference were defined according following criteria: >2-log killing, <2-log but >1-log killing, >1-log growth, and ±1-log killing, respectively. The lower limit of detection for the colony counts was 2 $\log_{10}$ CFU/ml. Time-kill curves were constructed by plotting the mean colony counts ($\log_{10}$ CFU/ml) versus time. To eliminate antibiotic carryover, all samples were diluted sufficiently prior to plating, or if the concentration was close to the MIC post dilution, they were subjected to vacuum filtration with 0.9% sodium chloride.

Macrophage Uptake Study. RAW 264.7 cells which are macrophage-like, derived from tumors induced in male BALB/c mice by the Abelson murine leukemia virus were used. 1 mM liposomes encapsulating Rhodamine B isothiocyanate were prepared by reverse phase evaporation method with the same lipid phase composition as vancomycin and cefazolin liposomes. RAW 264.7 cells were subcultured in Dulbecco's Minimum Essential Medium (DMEM) supplemented with 10% Fetal Bovine Serum (FBS) and 1% PenStrep antibiotic mixture. Cells were plated in petri plates at a population of 1 million cells that achieved up to 80% confluency. The confluent cells were treated with formulation containing 1 µM Rhodamine B isothiocyanate. Cells were subsequently fixed with 4% formaldehyde solution after analyzing for Rhodamine B signal at every time point and used for staining nuclei with Hoechst 33342 dye. For nuclear staining, the fixed cells were treated with 1 µg/ml solution of Hoechst 33342 in PBS and incubated under shaking in dark at room temperature for 15 minutes. Cells were examined for Rhodamine B and Hoechst 33342 signals at 2,4 and 6 hours post treatment under fluorescent microscope (Carl Zeiss Inc., Thornwood, New York, USA). The software used for analysis was provided by the manufacturer (AxioVision LE, USA).

Kidney Uptake in Healthy Mice. To evaluate the potential nephrotoxicity associated with vancomycin, 1 mM liposomes encapsulating the Near Infrared (NIR) dye, S0456 were prepared with the same method and composition as described previously. 20 nmole vancomycin-S0456 liposomes were injected in mice by tail-vein injection.

Results & Discussion.

% drug loading and % encapsulation efficacy. The % drug loading is reflective of the total drug that is encapsulated in the liposomes, and is a fraction of the total weight of the system. On the other hand, % encapsulation efficacy (or entrapment efficacy) reflects the amount of drug that is entrapped in the vesicles out of the total drug that is fed into the system. These two related terms are essential in determining the biological efficacy of the formulation and hence, dictate its success.

The % drug loading decreased markedly on increasing the concentration of the liposomes. On careful optimization of the lipid composition, the best liposomal formulation in terms of drug loading and entrapment efficacy was obtained with drug:lipid mixture ratio as 1:10 for vancomycin and 1:1 for cefazolin. Lipid phase ratio was constant (HSPC:Cholesterol:DSPE-mPEG in the ratio 1:0.5:0.07), as mentioned previously, unless stated otherwise. For 1 mM vancomycin liposomal formulation, the % drug loading and % encapsulation efficacy were 7% and 71.28%, respectively; however, they dropped down to 3.5% and 17.09% when 10 mM liposomes were prepared. On the other hand, for 1 mM cefazolin liposomal formulation, the % drug loading and % encapsulation efficacy were 11.48% and 12.94%, respectively, and increased up to 26% and 34% on formulating 10 mM liposomes.

These loading values are quite higher as compared to liposomes of the same drugs that were earlier reported in literature. The earlier methods employed thin-film hydration method for preparing liposomes in most of the cases, and with the success of reverse-phase evaporation method quite evident here in loading vancomycin and cefazolin in liposomes, it can be safely concluded that this is the best method suitable for a majority of hydrophilic drugs.

Figure 2:
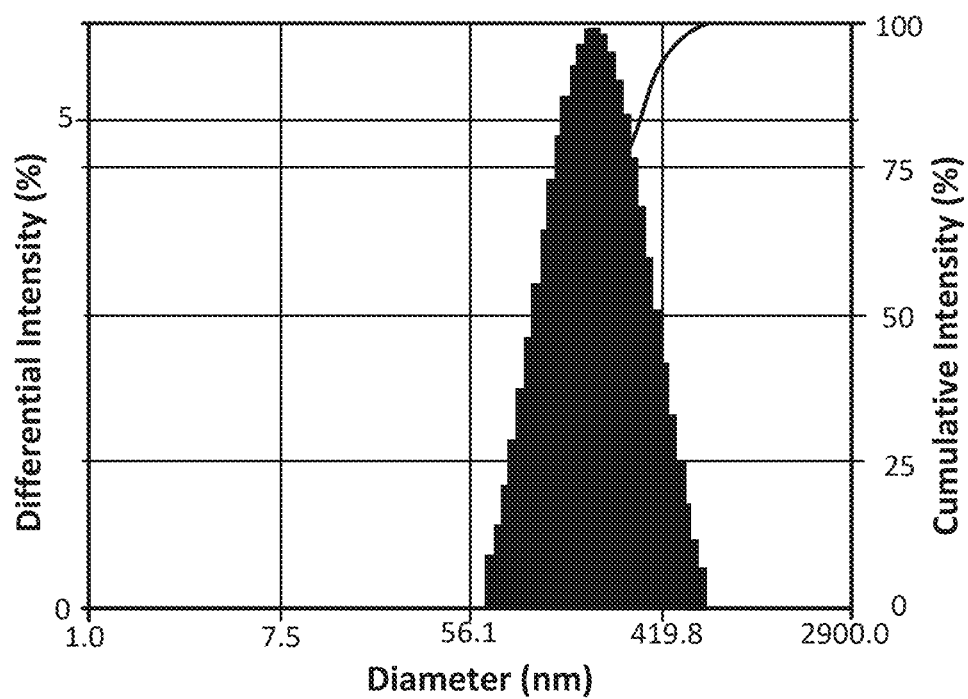
FIG. 2 is a histogram illustrating DLS of vancomycin liposomes, which shows a narrow size distribution. The particle size obtained with DLS (FIG. 1 and FIG. 2) matched that obtained by Transmission Electron Microscopy (TEM), as shown in FIG. 3 and FIG. 4.
Figure 3:
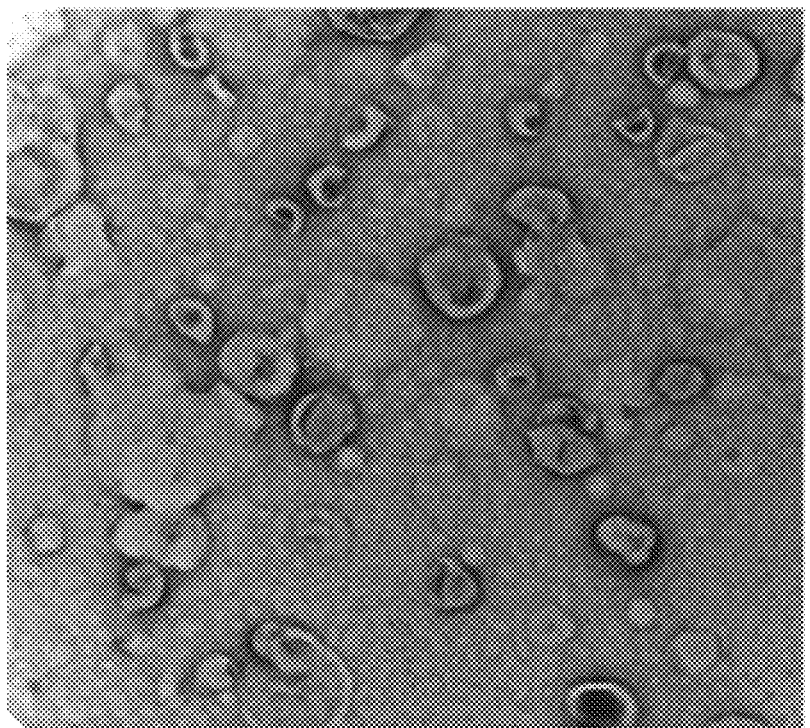
FIG. 3. shows the morphology of vancomycin liposomes under TEM; lipid bilayer formation is clearly shown. Scale bar: 100 nm.
Figure 4:
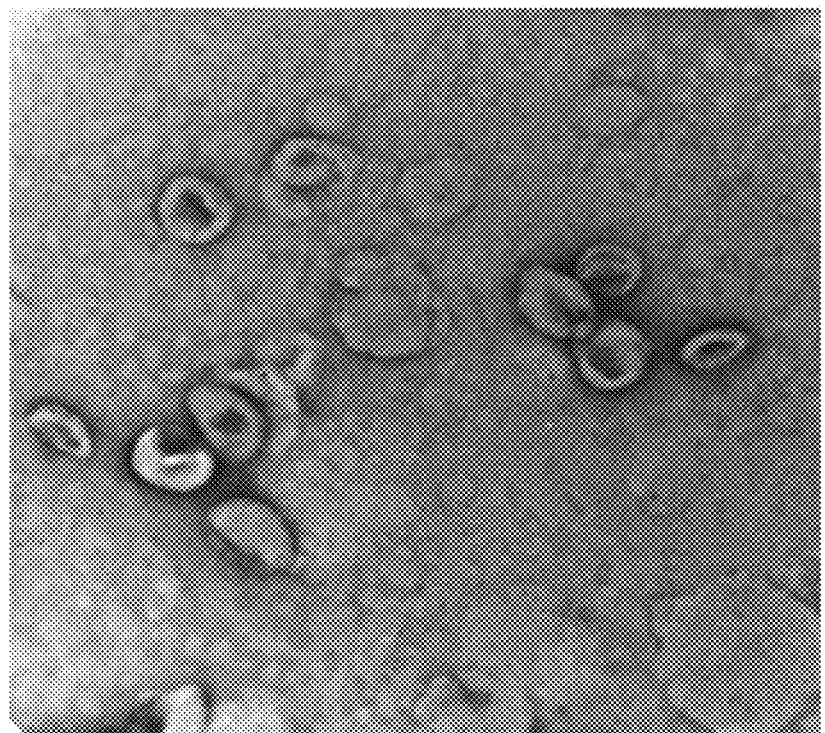
FIG. 4 shows the morphology of cefazolin liposomes under TEM; lipid bilayer formation is clearly shown. Scale bar: 100 nm.

Analysis of vesicle size by DLS and TEM. Liposomes are lipid bilayer vesicles. Hydrophilic drugs like vancomycin and cefazolin are loaded in the inner aqueous compartment of the vesicles. Dynamic Light Scattering (DLS) images for vancomycin and cefazolin are shown in FIGS. 1 and 2. Cefazolin liposomes have a mean particle size of 228 nm and a polydispersity index (PDI) of 0.235, indicating that a large number of cefazolin liposomes belong to a narrow size distribution. Similarly, vancomycin liposomes have a mean particle size of 176.5 nm and a PDI of 0.201.

Susceptibility testing. The Minimum Inhibitory Concentration (MIC) for vancomycin and cefazolin liposomes, both individually and in combination, were determined. The treatment groups were compared to their commercial drug counterparts, both individually and in combination. The MIC for the liposomal cefazolin and liposomal vancomycin against SA 494 and ATCC 29213 was found, and was compared to that of commercial cefazolin and vancomycin. SA 494 is the MRSA strain, and ATCC 29213 is the MSSA strain. The results were obtained as follows:

| | MC Values (mg/L) | | | | |
|---|---|---|---|---|---|
| Strain | CVAN | CCFZ | LVAN | LCFZ | LVAN + LCFZ |
| 494 | 1 | >16 | 0.0625 | >16 | 0.063 |
| 29213 | 0.5 | 0.5 | 0.0625 | 0.5 | 0.031 |

Abbreviations:
CVAN, commercial vancomycin;
CCFZ, commercial cefazolin;
LVAN, liposomal vancomycin;
LCFV, liposomal cefazolin;
LVAN + LCFZ, mix of LVAN and LCFZ.

The liposomal drug MICs are comparable to that of their commercial drug counterparts and their values seem appropriate.

To test the effect of the presence of one drug that may enhance the MIC of the other in combination, combination MIC studies were performed. The MIC of the liposomal cefazolin against 494 and 29213 was found in the presence of 0.5×the MIC of the liposomal vancomycin. The results for MIC of liposomal CFZ in 0.5×the MIC of liposomal VAN were as follows:

| Strain | MIC of Liposomal CFZ in 0.5 × the MIC of Liposomal VAN |
|---|---|
| 494 | 4 mg/L |
| 29213 | 0.5 mg/L |

Therefore, it can be concluded that the liposomal cefazolin MIC against 494 showed a multiple-fold decrease in the presence of 0.5×the MIC of liposomal vancomycin, decreasing from >16 mg/L without VAN, to 4 mg/L with. However, 29213 did not exhibit a liposomal cefazolin MIC decrease when combined with liposomal vancomycin, as both results were 0.5 mg/L.

Figure 5:
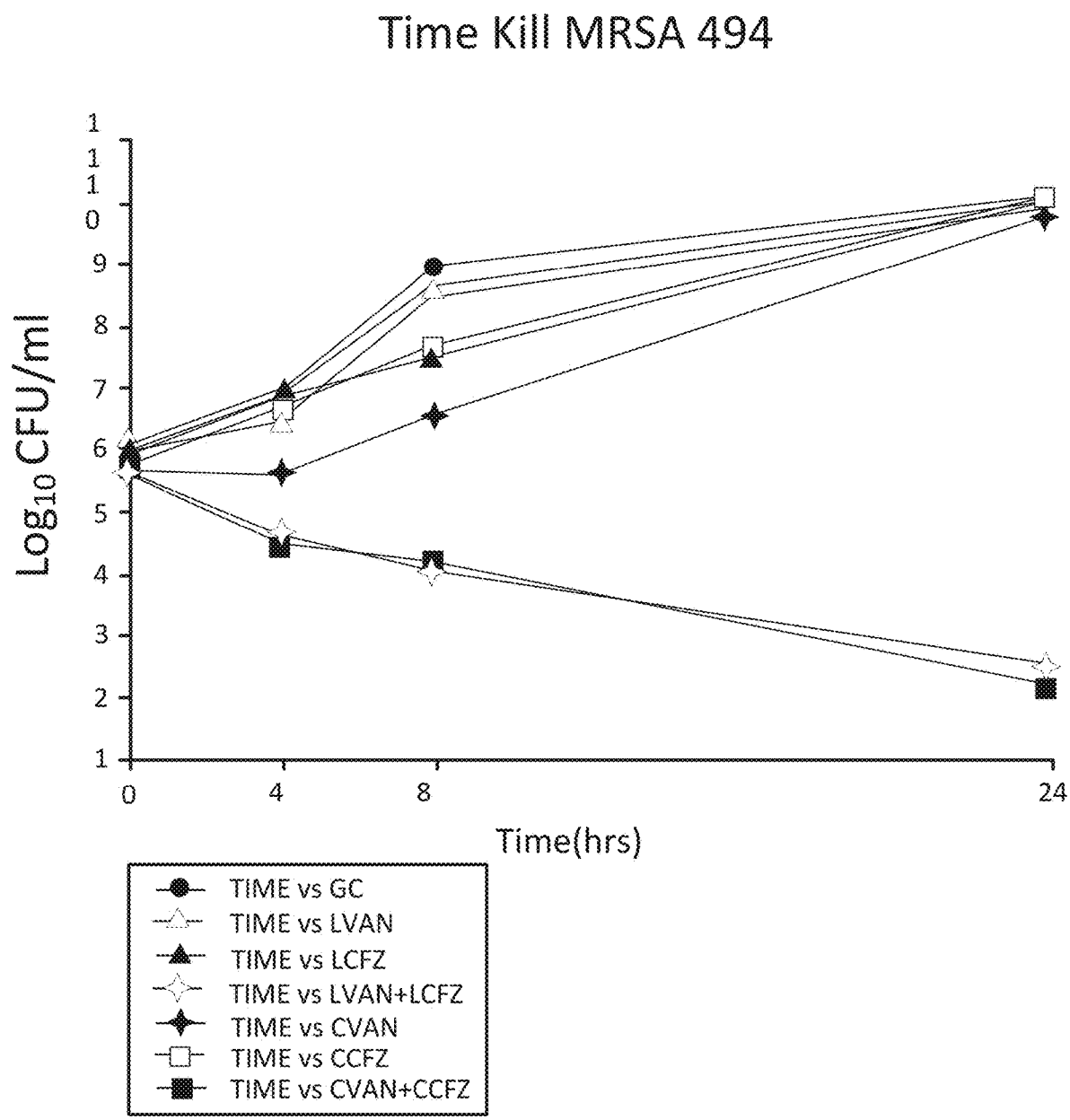
FIG. 5 is a graph showing a time-kill assay for MRSA 494 strain. Abbreviations: GC, Control; LVAN, liposomal vancomycin; LCFV, liposomal cefazolin; CVAN, commercial vancomycin; CCFZ, commercial cefazolin.
Figure 6:
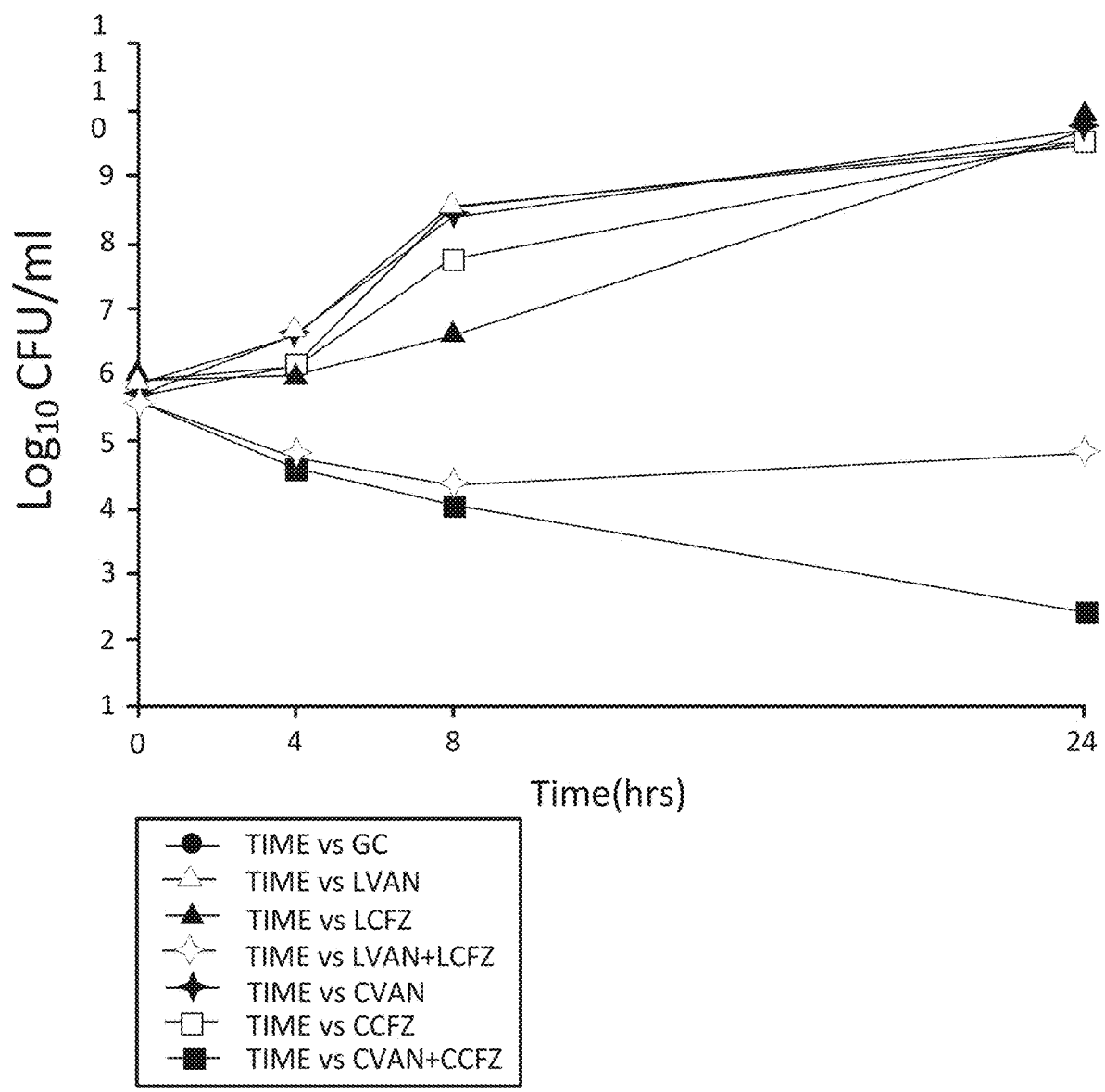
FIG. 6 is a graph showing a time-kill assay for MSSA 29213 strain. Abbreviations: GC, Control; LVAN, liposomal vancomycin; LCFV, liposomal cefazolin; CVAN, commercial vancomycin; CCFZ, commercial cefazolin.
Figure 7A:
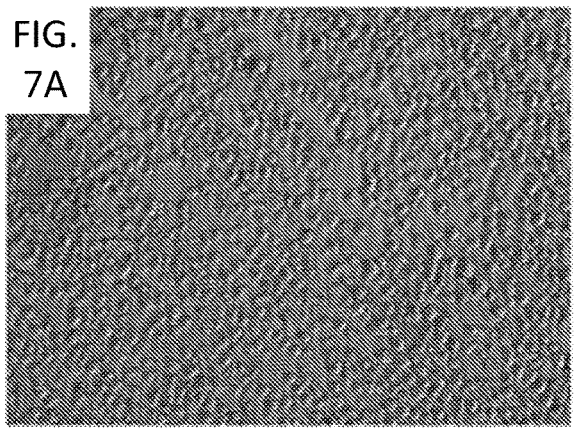
FIG. 7A-7D is a series of micrographs of RAW264.7 cells.
Figure 7B:
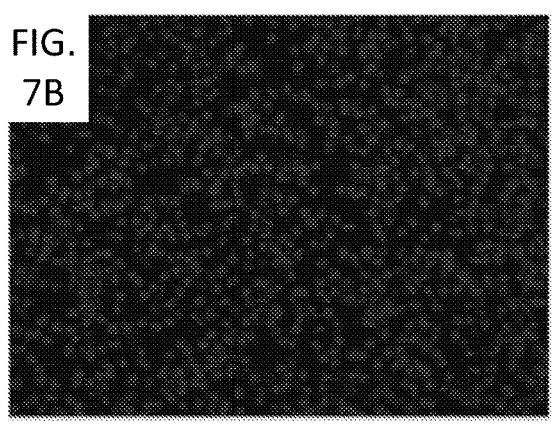
Figure 7C:
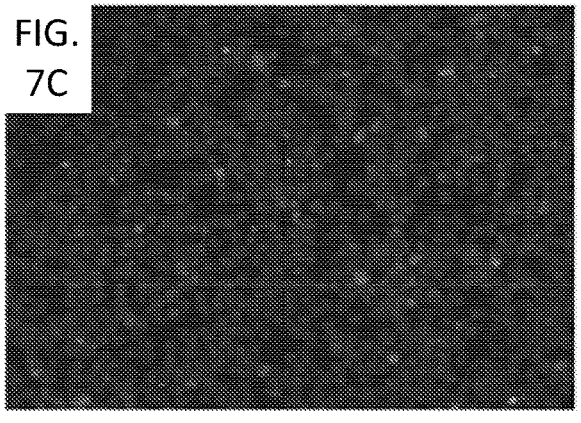
Figure 7D:
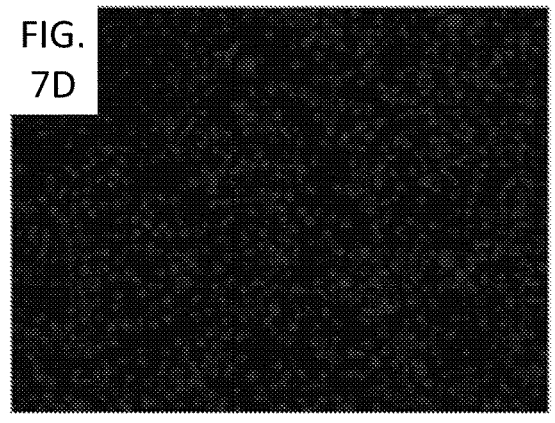

Time-kill analysis. FIGS. 5 and 6 show the inoculum of 494 and 29213 in $\log_{10}$ colony forming units per mL charted against time in hours from the kill-curve assays against liposomal vancomycin and cefazolin, as well as commercial vancomycin and cefazolin. Liposomal vancomycin and cefazolin are abbreviated by LVAN and LCFZ, and commercial vancomycin and cefazolin are abbreviated as CVAN and CCFZ, respectively. Synergy between two drugs is defined as a final inoculum difference (at 24 hours) of 2 $\log_{10}$ CFU/mL or greater between the drug combination and single-drug regimens.

The combination of both liposomal vancomycin with liposomal cefazolin and commercial vancomycin with commercial cefazolin was synergistic (>2 log CFU/mL final inoculum difference than that of single drug).

Macrophage uptake study. One of the mechanisms by which S. aureus gains antibiotic resistance is by residing in the macrophages, avoiding recognition from the predatory antibiotic molecules. Hence, it was thought to be interesting to visualize the penetration of the developed liposomal formulation in the cytosol of RAW 264.7 cells, which could be a potential combat for targeting MRSA and subsequently, arresting the spread of MRSA infection. FIG. 7 shows the fluorescent microscopy images for Rhodamine B-encapsulated liposomes treated in RAW 264.7 cells, and observed under Rhodamine B and Hoechst 33342 filters for cytosol and nuclear staining, respectively. The red signals appear around the blue ones, implying that the Rhodamine B liposomes have been effectively internalized in the cytosol of cells around the blue-stained nucleus.

Kidney uptake in healthy mice. Vancomycin is dose-limiting at higher doses because of associated nephrotoxicity. S0456-vancomycin liposomes (LVAN-encapsulated NIR dye S0456) did not exhibit deposition in kidney, suggesting minimal or no associated nephrotoxicity in healthy mice. See FIGS. 8A-8D.

MRSA remains a superbug worldwide with high morbidity and mortality. Antimicrobial antibiotics are traditionally used in their pure form, but they come with drawbacks associated with dose accumulative toxicity and failure to survive for a long time in biological milieu. Stealth nanoparticles like liposomes provide the drugs with prolonged circulation time and prevent the deposition of the formulation in major organs like heart, kidney, and liver in high concentrations. VAN, the antibiotic used in the present work is well known to cause renal damage. S. aureus, which is capable of surviving within the macrophage environment, increases the ability of this organism to spread and contributes to recurrent and relapsing infection. The fact that this organism can survive treatment by residing in the macrophage is one major factor responsible for treatment resistance and the emergence of highly-resistant strains. The formulated liposomes described herein have shown localization in the cytosol of RAW264.7 cells cultured in vitro. RAW264.7 are a macrophage cell subtype, and the visualization of cellular uptake strengthens the hypothesis that the formulated liposomes can survive in the macrophage milieu.

Example 2

Additional Analyses of Liposomal Antibiotic Preparations

This example describes additional characterization of antibiotic-loaded liposomes produced as described in Example 1.

Chromatography Conditions for Analysis: Sensitive, selective, and robust reverse-phase high performance liquid chromatography (RP-HPLC) methods for detection of VAN and CFZ were developed and validated using Waters® 2695 Separations Module equipped with Waters® 2996 Photodiode Array Detector. Analysis was done by Empower® 3 software connected to the HPLC module. The HPLC analytical methods were validated as per ICH guidelines Q2 (R1) (2005).

Briefly, for VAN, the mobile phase consisted of acetonitrile:water in the ratio 8.5:91.5 (v/v) with pH adjusted to 3.0 by orthophosphoric acid and supplemented with 0.1% triethylamine to reduce tailing. Chromatographic separations were performed on Waters Resolve™ C18 RP-HPLC column (150 mm×3.9 mm, 5µ) at detection wavelength of 230 nm and flow rate isocratic at 1 mL/min. A standard curve was plotted with n=3. The HPLC analytical (Waters 2695 Separations Module, Waters Corporation, Milford, MA, USA) method for CFZ was developed based on the teachings of Singh et al. (Diagn Microbiol Infect Dis 91:363-370, 2018) with slight modifications. Briefly, the system consisted of 0.05 M $KH_2PO_4$: acetonitrile (90:10, v/v) pH 5.0 as the mobile phase at an isocratic flow rate of 1.5 mL/min, and detection wavelength 254 nm. Chromatographic separations were performed on Phenomena® C8 RP-HPLC column (250 mm×4.6 mm, 5µ). Standard curve was plotted with n=3. For both the drugs, the mobile phase was filtered under a vacuum through a 0.22 µm filter and degassed for 10 min prior to analysis. A 10 µL sample loop was used for analysis.

In Vitro Release Study: Since both VAN and CFZ are hydrophilic drugs with negative log P values (−3.1 and −0.58, respectively), we evaluated the drug release kinetics of CFZ as a representative drug. In vitro drug release study was performed by a dialysis method modified in-house. This method used a minimum volume of formulation and release buffer, thus avoiding wastage of materials. Briefly, 200 µL of LCFZ was introduced to Slide-A-Lyzer™ Mini dialysis device, 3.5 kDa MWCO (Thermo Fisher Scientific, Waltham, MA, USA), which was plugged into a 1.5 mL microcentrifuge tube (Thermo Fisher Scientific, Waltham, MA, USA) containing 1 mL of PBS pH 7.4 as release buffer. The assembly was placed on a magnetic stirrer (Thermo Fisher Scientific, Waltham, MA, USA) at 350 rpm, 37° C. Aliquots of 500 µL were removed from the release buffer at pre-determined time points up to 72 h. An equal volume of release buffer was replaced at every time point to maintain sink-conditions. The aliquots were analyzed by HPLC to quantify CFZ released in the buffer. The graph of % cumulative release versus time (hours) was plotted using Graph-Pad Prism 7 (GraphPad Software Inc., La Jolla, CA, USA) with n=2.

Shelf-Life Stability Study: Shelf-life stability of LVAN and LCFZ was assessed by change in vesicle size and polydispersity index after six months using DLS.

Results:

Chromatography Conditions for Analysis: Drugs like VAN and CFZ absorb light in the ultraviolet range and their determination is likely to be affected by most of the organic compounds. Thus, it was imperative to develop and validate selective and robust HPLC analytical methods for VAN and CFZ for accurate quantification of drug contained within the liposomal vesicles. The HPLC analytical methods for VAN and CFZ were validated as per ICH guidelines Q2 (R1) (2005). The calibration curve for the VAN HPLC method was linear in the range of 2.5 to 50 µg/mL with a correlation coefficient ($R^2$) of 0.9991. The LOD and LOQ for VAN were 0.205 µg/mL and 0.684 µg/mL respectively. On the other hand, the calibration curve for CFZ was linear in the range of 1.5625 to 100 µg/mL, with a $R^2$ of 1. The LOD and LOQ for CFZ were 0.382 µg/mL and 1.274 µg/mL respectively. Retention times for VAN and CFZ were 6.09 min and 12.42 min respectively.

Figure 9:
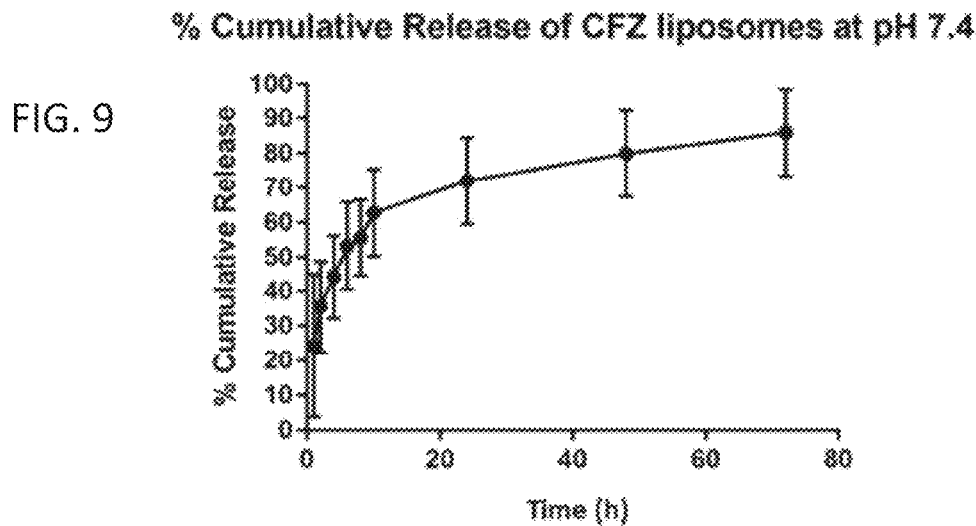
FIG. 9 is a graph showing percent (%) cumulative release of CFZ from CFZ-loaded liposomes at pH 7.4, at the times specified.

In Vitro Release Study: Since both VAN and CFZ have similar solubility profiles, we evaluated the release profile of LCFZ alone to represent the release kinetics of highly water-soluble drugs. Release kinetics was evaluated at pH 7.4 to mimic intravenous conditions, since CFZ is administered to patients as an injectable dosage form in the clinic. As shown in FIG. 9, LCFZ showed immediate release of 20%, followed by a sustained-release pattern over 72 h, with a maximum of 85% release of CFZ. The immediate release acts like a 'depot' source of the drug at the site of infection, while the sustained release pattern may ensure maintenance of the drug dose.

Figure 10A:
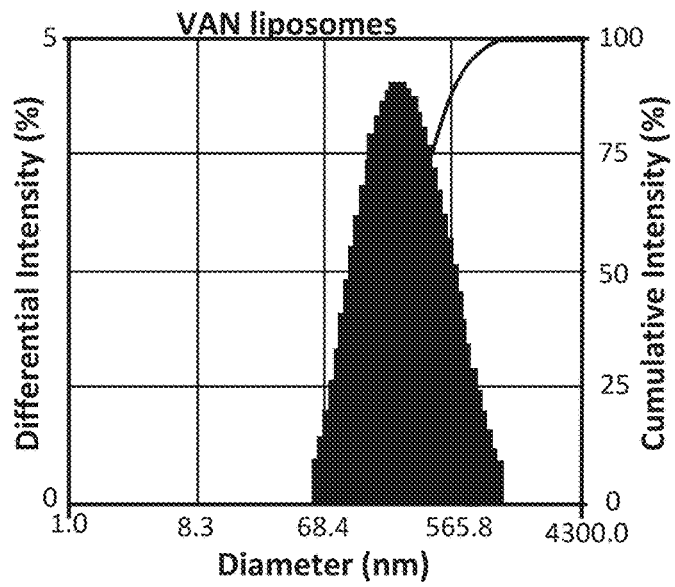
FIG. 10A-10B show histograms of vesicle size of VAN liposomes (FIG. 10A) and CFZ liposomes (FIG. 10B) after six months of shelf-storage. The particle size distribution is similar that of freshly made liposomes (see for instance FIG. 1), which indicates the liposomes have very good self-life stability.
Figure 10B:
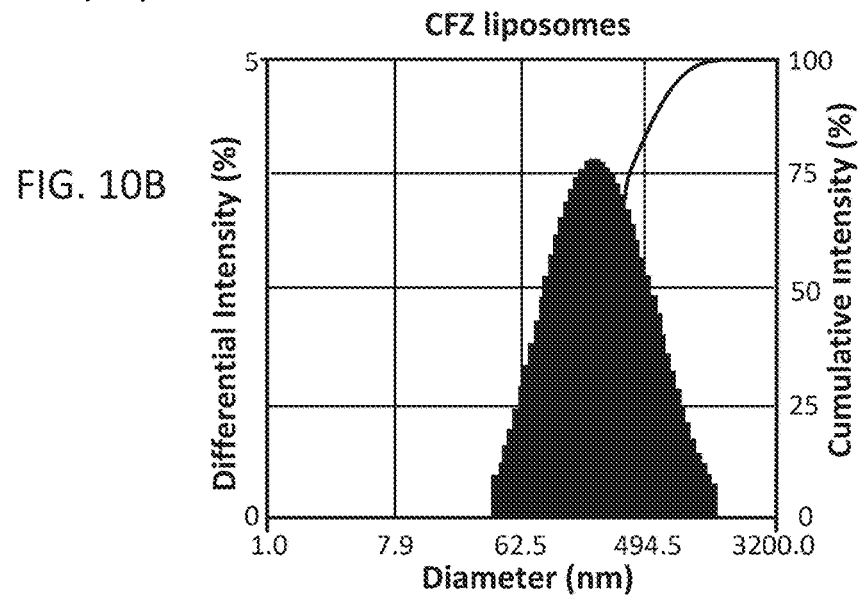

Shelf-Life Stability Study: We determined the shelf-life stability of LVAN and LCFZ over a period of six months by assessing the change in vesicle size and PDI. As demonstrated in FIGS. 10A-10B, the vesicle size of LVAN increased from 176.5 nm to 224 nm with an increase in size distribution as the PDI changes from 0.201 to 0.278. LCFZ did not have a major difference in vesicle size (243 nm, PDI 0.162). For both LVAN and LCFZ, though there were changes in the vesicle size, the integrity of the liposomes seemed to be maintained, since there were no aberrant changes in PDI. The phospholipid and cholesterol components of liposomes were responsible for the integrity and stability of the vesicle over a prolonged period.

Example 3

Production of Additional Drug-loaded Liposomal Vesicles

Optimization of lipid and drug ratio was extensively performed, in order to obtain high drug loading (wt./wt.) For both vancomycin and cefazolin, quantification of drug loading was done based on robust, standardized, and accurate HPLC detection methods (see Example 2).

10 mM liposomes were synthesized as described in Example 1, with a drug to lipid ratio of 1:1. For this example, the proportions (ratio) of HSPC:Cholesterol: DSPE-mPEG:DSPE-PEG-Folate ate were 1:0.05:0.007: 0.007. High drug loading (weight/weight) was achieved with respect to VAN and CFZ in the liposomal vesicles. Using the production methods provided in Example 1, drug loading of up to 40% (wt./wt.) for VAN and up to 33% (wt./wt.) for CFZ was achieved. The % encapsulation efficacies for VAN and CFZ were 75% and 60%, respectively.

Example 4

Combination Antibiotic Liposomes

This example describes the preparation and characterization of liposomes containing a mixture of both vancomycin and cefazolin, namely L(VAN+CFZ).

Vancomycin and cefazolin were taken in 1:1 ratio in buffered saline. We synthesized 10 mM liposomes containing both VAN and CFZ, referred to here as L(VAN+CFZ). The drug to lipid ratio of 1:1. The molar ratio of HSPC: Cholesterol:DSPE-mPEG:DSPE-PEG-Folate are 1:0.05: 0.007:0.007. The method of preparing liposomes was same as that in the Example 1.

The following table shows the Minimum Inhibitory Concentration (MIC) values for different treatment groups against strains 494 (MRSA) and 29213 (MSSA). MRSA 494 is resistant to CFZ, which was demonstrated by an increase in MIC values. However, liposomal VAN+CFZ [L (VAN+CFZ)] performed much better as compared to commercial VAN+CFZ (a mixture of non-liposomal antibiotics) in MRSA 494/MSSA 29213. The L(VAN+CFZ) has more than >2-4 fold improvement of MIC as compared to VAN+CFZ. Lower the MIC, the better is the MRSA killing.

| | MIC values (mg/L) | | | | | | Fold improvement L(VAN + CFZ) over |
|---|---|---|---|---|---|---|---|
| Strain | VAN | CFZ | LVAN | LCFZ | VAN + CFZ | L(VAN + CFZ) | (VAN + CFZ) |
| MRSA 494 | 1 | >64 | 0.5 | >16 | 0.5 | <0.125 | >4 |

-continued

| | MIC values (mg/L) | | | | | | Fold improvement L(VAN + CFZ) over |
|---|---|---|---|---|---|---|---|
| Strain | VAN | CFZ | LVAN | LCFZ | VAN + CFZ | L(VAN + CFZ) | (VAN + CFZ) |
| MSSA 29213 | 0.5 | 0.5 | 0.5 | 0.5 | 0.25 | <0.125 | >2 |

Abbreviations: VAN, vancomycin; CFZ, cefazolin; LVAN, liposomal VAN; LCFZ, liposomal CFZ; (VAN + CFZ), mix of non-liposomal VAN & CFZ; L(VAN + CFZ), liposomes containing a mixture of VAN & CFZ.

Example 5

LVAN Penetration of S. aureus Biofilm

This example describes evaluation of liposomal vancomycin preparation effects on biofilm cultures of S. aureus.

Using a CDC Biofilm Reactor® (BioSurface Technologies Corp., Bozeman, MT; Gilmore et al., *J Biomed Mater Res B Appl/Biomater.* 93(1):128-140, 2010), biofilm formation was evaluated on different prostatic/catheter materials, specifically polyurethane coupons. Pharmacodynamid pharmacokinetic parameters were measured in these models during the treatment period. During the incubation phase, initial inoculum was incubated in the reactor for 24 hours prior to starting the fast flow model. After this initial phase, conditioning phase or fast flow rate phase was performed for 16 hours to stabilize biofilms on coupons. After this period, the model starts with dynamic flow and antibiotic release which were simulated according the calculated $C_{max}$ in human subjects (Barber et al., *Antimicrob. Agents Chemother* 59:4497-503, 2015).

Figure 13A:
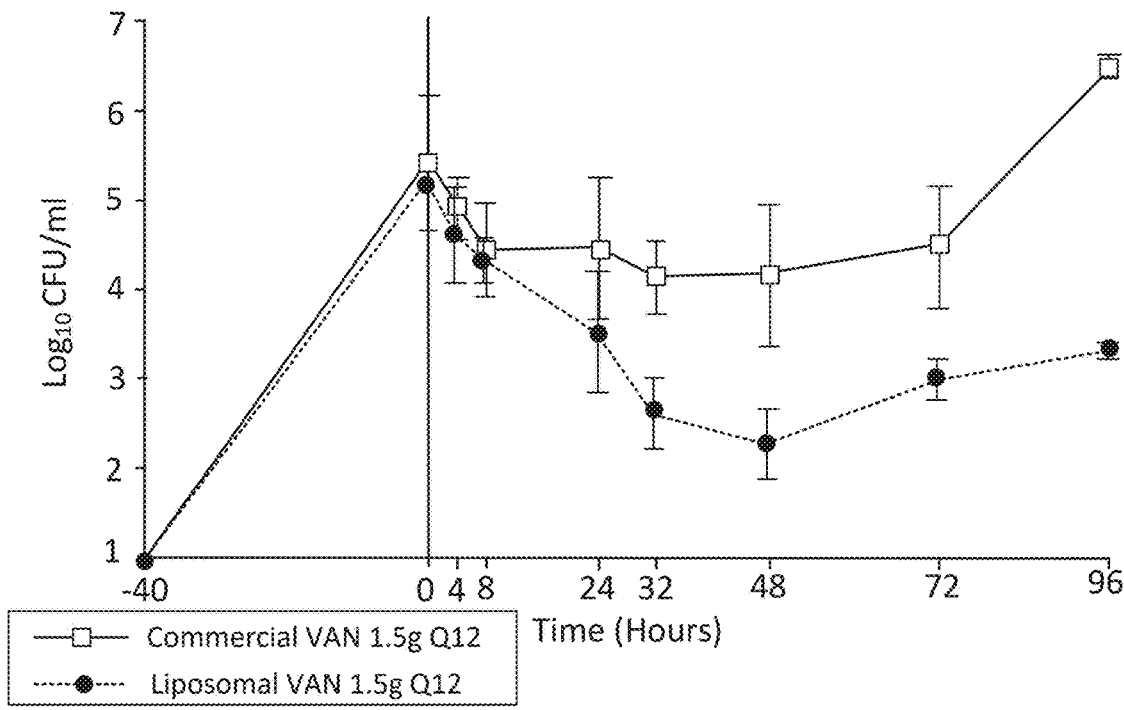
FIG. 13A is a time-kill curve comparing commercial (solid line) versus liposomal (dashed line) VAN treatment groups in MRSA N315. Liposomal VAN (LVAN) treatment results in a much lower count of bacterial colony forming unit (represented by $\log_{10}$ CFU) as compared to commercial VAN at the same dose.

The results of the CDC Biofilm Reactor® experiment are shown in FIG. 13A. FIG. 13A is a time-kill curve comparing commercial versus liposomal VAN treatment groups (liposomes prepared as described in Example 3). LVAN treatment (dashed line) results in a much lower count of bacterial colony forming unit (represented by logo CFU) as compared to commercial VAN (solid line) at the same dose.

Figure 13B:
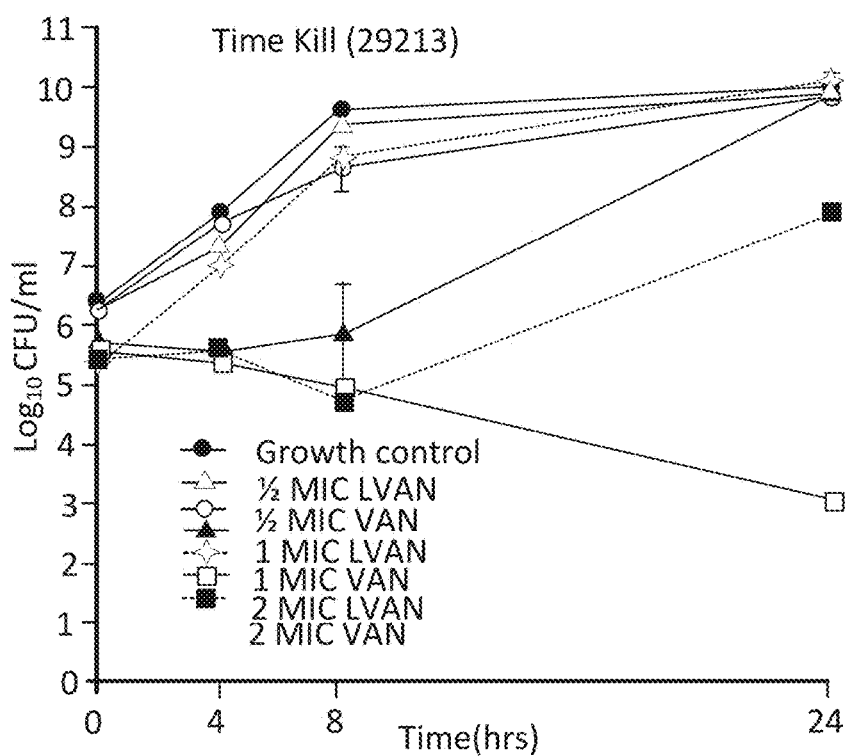
FIG. 13B is a time-kill curve in MSSA 29213, illustrating that LVAN causes enhanced bacteria killing effect at 2×MIC, whereas commercial VAN treated organisms grow above the initial inoculum at 24 h. The lower the MIC, the better is the MRSA killing.

FIG. 13B shows the results of a time-kill analysis performed with susceptible strain ATCC 29213. The time-kill studies were carried out against vancomycin (VAN) and liposomal vancomycin (LVAN) at 1/2×MIC, 1×MIC, 2×MIC. Time kill analysis was performed in 24 well plates according to CLSI guidelines (Patel 2017. M100: Performance Standards for Antimicrobial Susceptibility Testing, 27th Edition .224). Bactericidal activity was defined as >3 log CFU/ml reduction from baseline (initial inoculum). FIG. 13B shows LVAN caused enhanced bacteria killing effect at 2×MIC, whereas VAN treated organisms grow above the initial inoculum at 24 h. Lower the MIC, the better is the MRSA killing.

Example 6

Biofilm Disruption

This example describes analysis of biofilm disruption and antibacterial activity of liposome encapsulated antibiotics.

The Minimum Inhibitory Constant (MIC) in presence of biofilm was determined using the pin lid method or Calgary biofilm device (Barber et al., *Antimicrob Agents Chemother.* 58(5):2989-92, 2014; De Oliveira et al., *Int J Mol Sci.* 17(9), 2016). This method is used for defining the biofilm MIC vs. antibiotic or combination of antibiotics. Generally, biofilms demonstrate higher MIC values in comparison to planktonic state. Using the pin lid method, biofilms were stabilized on the pins during 24 hour incubation; the antibiotic was then added to test the potency.

Figure 14:
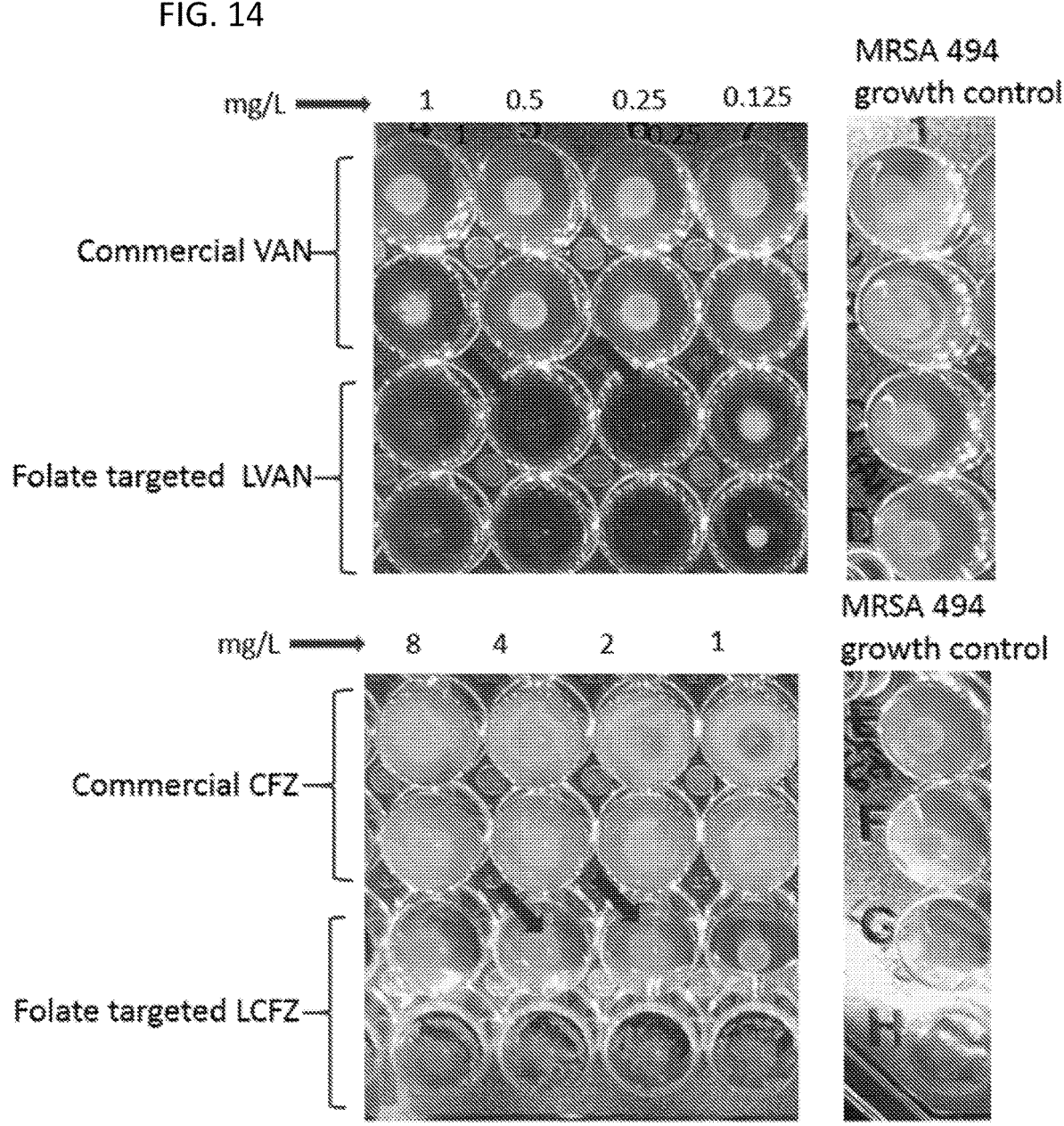
FIG. 14 shows MRSA 494 biofilm disruption with commercial VAN and CFZ, and folate targeted LVAN and LCFZ. Folate targeted LVAN showed a complete wipeout of the biofilm at a minimum of 0.25 mg/ml, whereas the commercial VAN barely showed any anti-biofilm effect at that level. MRSA 494 is resistant to CFZ, as illustrated by the lack of antimicrobial activity with all of the CFZ treatment groups. The disappearance of MRSA colony in the well with folate targeted LVAN treatment (arrows), illustrates the superior disruption of biofilm.

FIG. 14 shows the MRSA 494 biofilm disruption with commercial VAN and CFZ, and folate targeted LVAN and LCFZ (prepared as described in Example 3). Folate targeted LVAN showed a complete wipeout of the biofilm at a minimum of 0.25 mg/ml, whereas the commercial VAN barely showed any anti-biofilm effect. Since MRSA 494 is resistant to CFZ, we did not get any antimicrobial activity with any of the CFZ treatment groups. The disappearance of MRSA colony in the well, as shown by red arrow indicates the superior disruption of biofilm.

Figure 15:
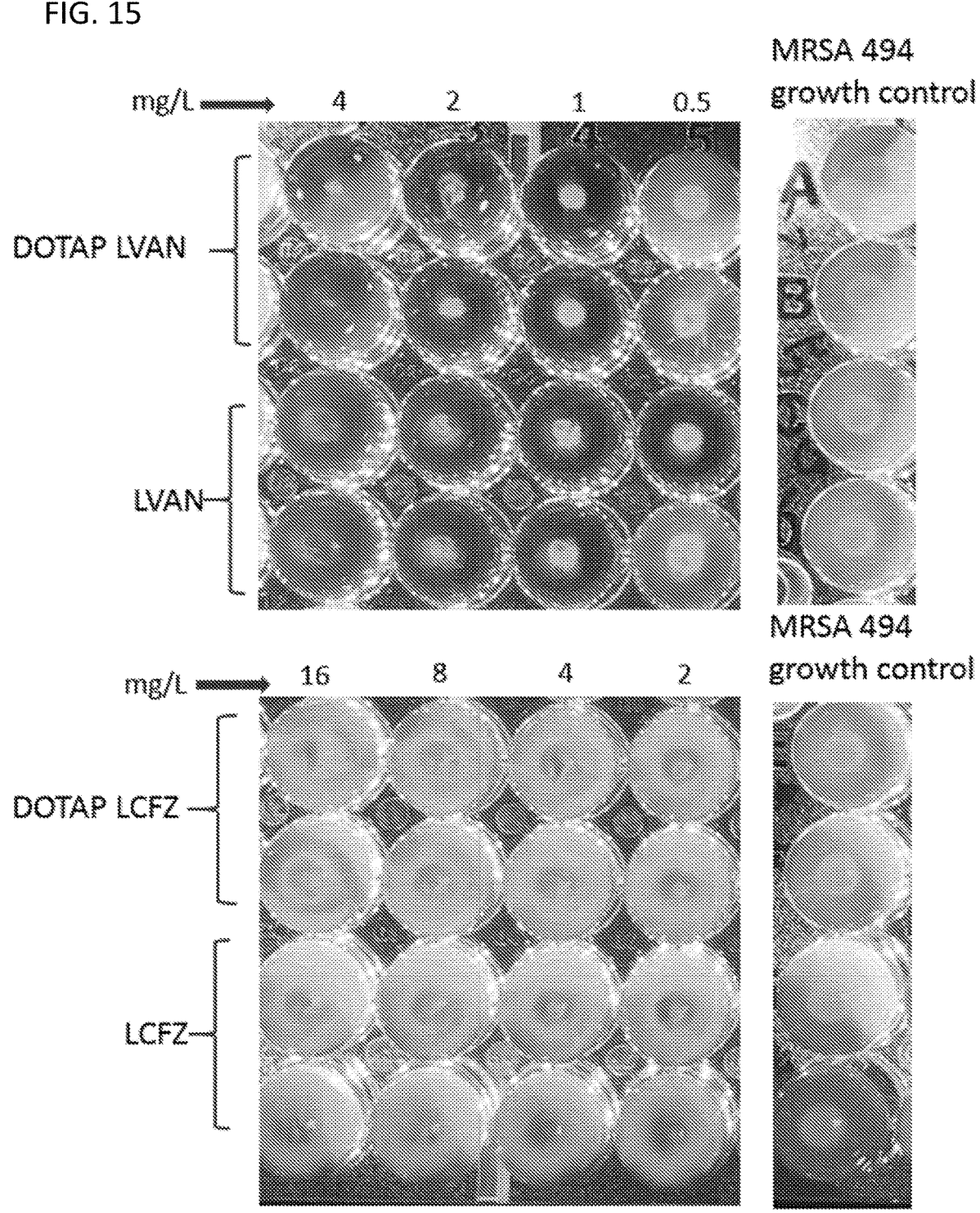
FIG. 15 shows MRSA 494 biofilm disruption with LVAN and LCFZ fabricated with DOTAP (cationic lipid), and the conventional LVAN and LCFZ. DOTAP LVAN and LVAN give a reduction in biofilm at higher concentrations than was needed with folate targeted LVAN (FIG. 14), indicating they are less sensitive as compared to the latter. CFZ does not work against MRSA 494 as the strain is resistant to the drug.

FIG. 15 Shows the MRSA 494 biofilm disruption with LVAN and LCFZ fabricated with DOTAP (cationic lipid), and the conventional LVAN and LCFZ. DOTAP LVAN and LVAN give a reduction in biofilm at higher concentrations compared to folate targeted LVAN, rendering them less sensitive as compared to the latter. CFZ does not work against MRSA 494 as the strain is resistant to the drug.

Figure 16:
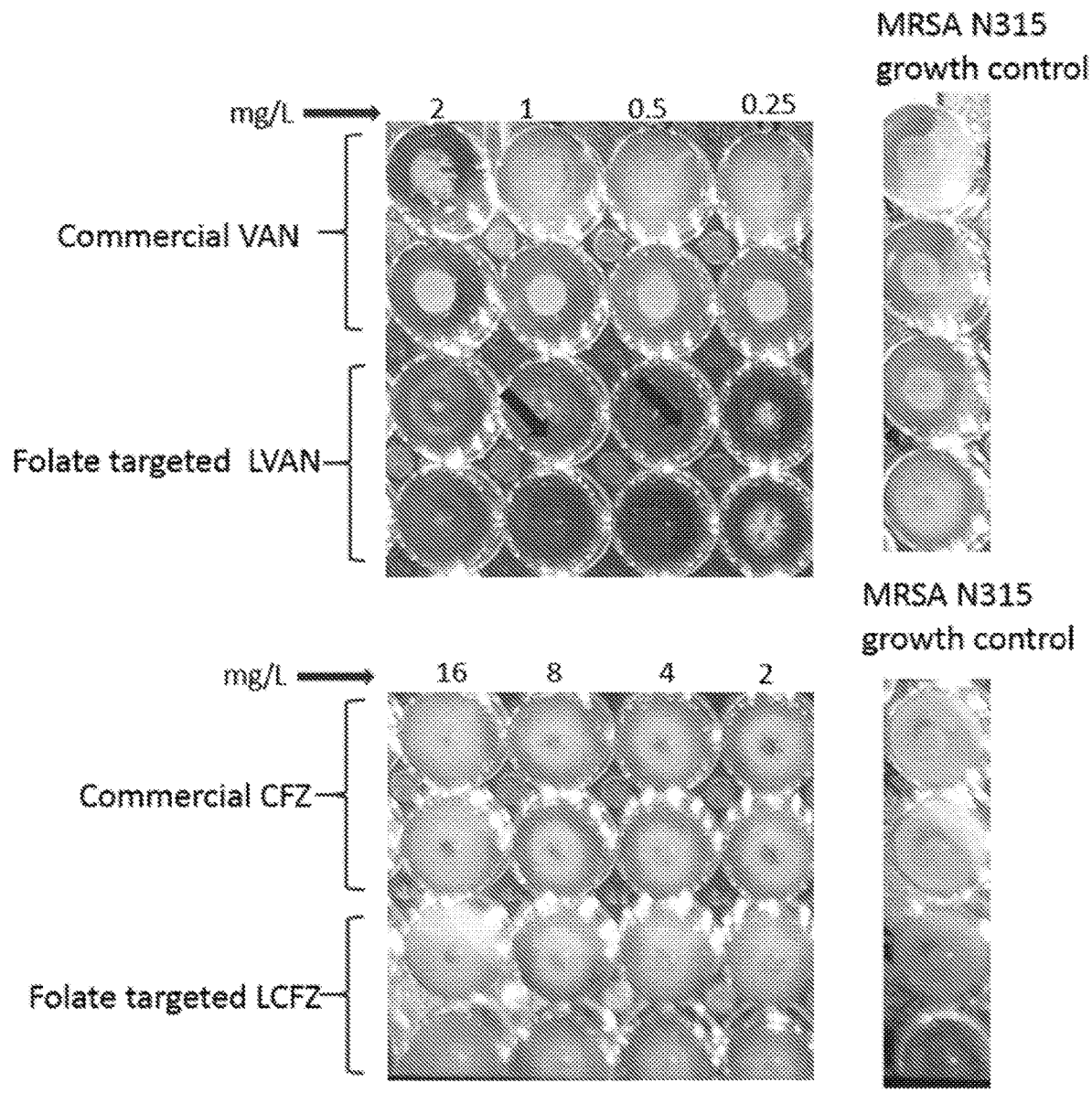
FIG. 16 shows MRSA N315 biofilm disruption with commercial VAN and CFZ, and folate targeted LVAN and LCFZ. Folate targeted LVAN showed a reduction in the biofilm at a minimum of 0.5 mg/L dose. The disappearance of MRSA colony in the well (arrow) illustrates the superior disruption of biofilm. MRSA N315 is resistant to CFZ.

FIG. 16 shows the MRSA N315 biofilm disruption with commercial VAN and CFZ, and folate targeted LVAN and LCFZ. Folate targeted LVAN showed a reduction in the biofilm at a minimum of 0.5 mg/L dose. The disappearance of MRSA colony in the well, as shown by red arrow indicates the superior disruption of biofilm.

Figure 17:
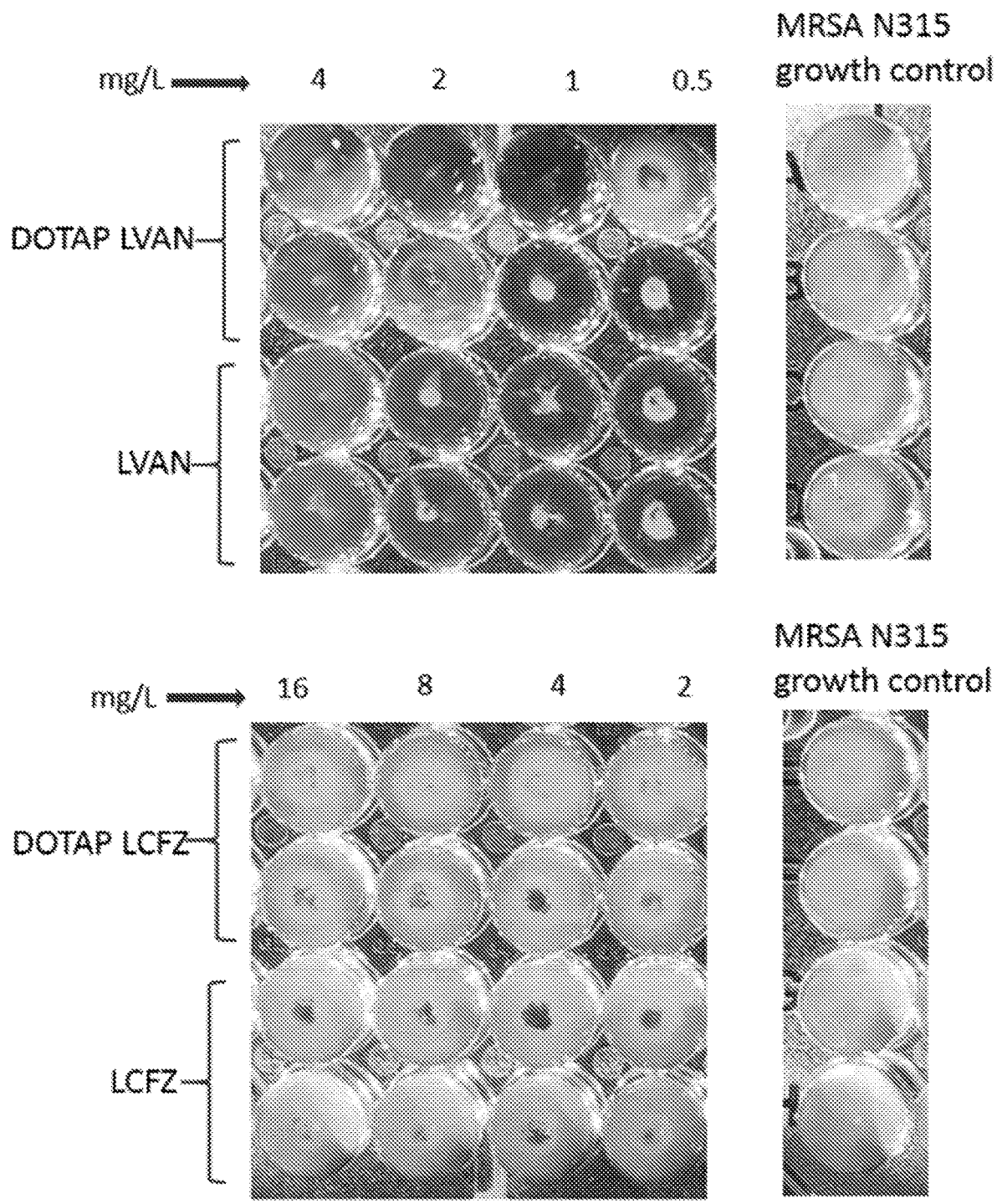
FIG. 17 shows MRSA N315 biofilm disruption with LVAN and LCFZ fabricated with DOTAP (cationic lipid), and the conventional LVAN and LCFZ. DOTAP LVAN and LVAN give a reduction in biofilm at higher treatment concentrations compared to folate targeted LVAN, rendering them less sensitive as compared to the latter. MRSA N315 is resistant to CFZ.

FIG. 17 shows the MRSA N315 biofilm disruption with LVAN and LCFZ fabricated with DOTAP (cationic lipid), and the conventional LVAN and LCFZ. DOTAP LVAN and LVAN give a reduction in biofilm at higher treatment concentrations compared to folate targeted LVAN, rendering them less sensitive as compared to the latter.

Example 7

Characterization Using Mice Thigh Infection Model

This example describes in vivo analysis of vancomycin preparations, using a murine thigh infection model.

24-27 g CD-1 (Swiss ICR) mice were induced with neutropenia by intraperitoneal (I.P.) injections of cyclophosphamide at 150 mg/kg of body weight at 4 days and 100 mg/kg at 1 day before infection. The bacteria (MSSA 29213 and MRS 33591) were grown in MH broth using a shaking incubator at 37° C. until log-phase growth. The bacterial cells were collected by centrifugation, washed, and diluted in phosphate-buffered saline (PBS) to achieve the desired starting inoculum as determined by optical density (OD) measurement. The thigh infections were produced by injection of 0.1 ml of each inoculum into the thighs of isoflurane-anesthetized mice 2 h before antimicrobial therapy. In control animals, the disease model was progressive based on an increase in pathogen load (2-3 $\log_{10}$) by 24 hours.

Drug Administration: VANNP (nano-particle encapsulated VAN; produced as in Example 3, with a composition of 1:0.05:0.007:0.007 HSPC:cholesterol:DSPE-mPEG: DSPE-PEG-folate) and VAN were administered by I.P.; dosing with range and frequency of administration for 0.3125 to 80 mg/kg/6 h.

Thigh isolation: At the start of therapy (2 h after infection) and the end of therapy (24 h) all animals were euthanized and thighs of mice were removed and individually homogenized in normal saline. Ten-fold serial dilutions of the thigh homogenates was plated and incubated overnight at 37° C. Bacterial colony counts for each thigh are considered independent observations. The efficacy of VAN and VANNP was calculated as the change in the $\log_{10}$ CFU (colony forming units) measured with respect to control animals. 4-6 mice were used for each dose level or dosing regimen.

Figure 18A:
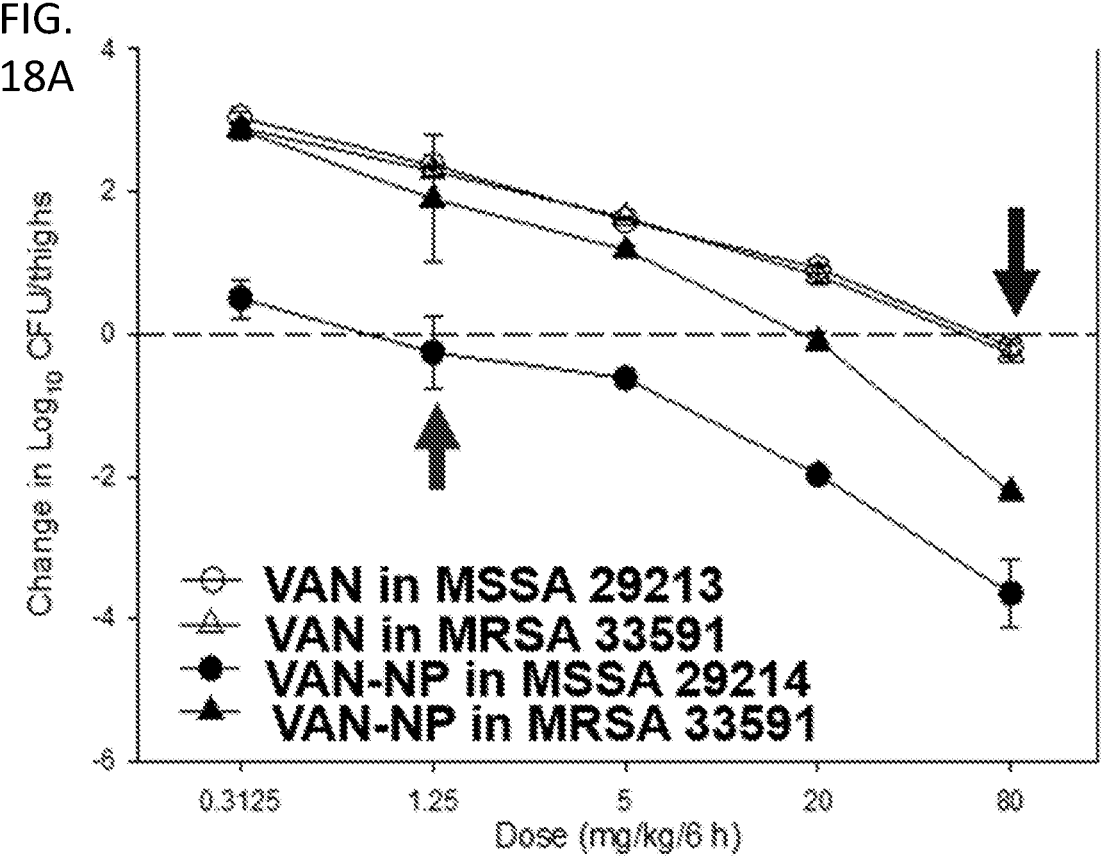
FIG. 18A is a graph illustrating the superior bactericidal effect of Folate-LVAN in a mouse thigh infection model. The bactericidal activity of LVAN at 1.25 mg/kg/6 h for S. aureus is equivalent to 80 mg/kg/6 h dose of VAN treatment; this difference of $\log_{10}$ CFU/thighs is indicated by arrows.
Figure 18B:
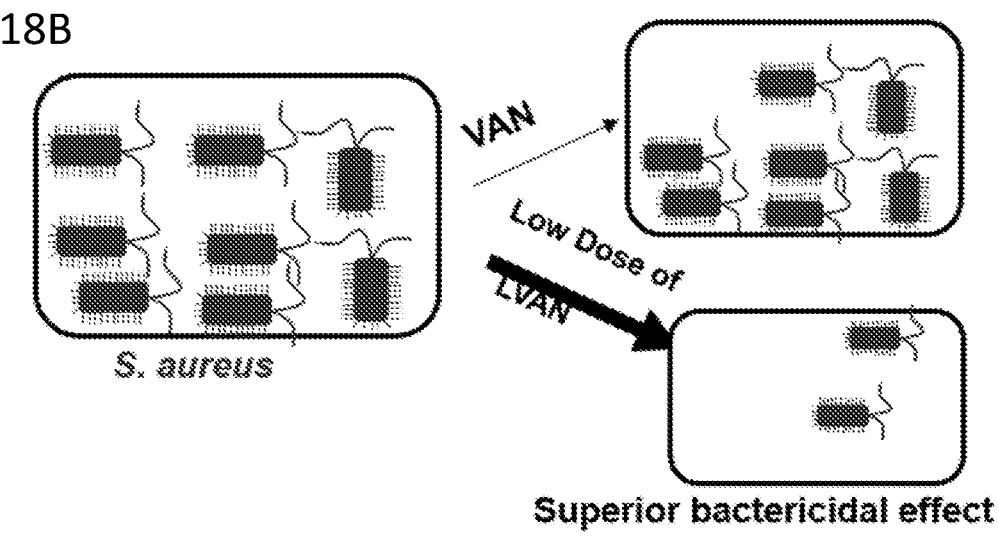
FIG. 18B is a cartoon illustrating LVAN will be a potent therapy against S. aureus at a lower dose of VAN.

FIG. 18A shows the superior bactericidal effect of Folate-LVAN in mice thigh infection model. The bactericidal activity of LVAN at 1.25 mg/kg/6 h for *S. aureus* is equivalent to 80 mg/kg/6 h dose of VAN treatment. The difference of $\log_{10}$ CFU/thighs is indicated by arrow. FIG. 18B is a cartoon illustrating LVAN will be a potent therapy against *S. aureus* at lower dose of VAN.

Example 8

Acidic pH-Responsive VAN-prodrug Encapsulated Liposomes

Another contemplated embodiments is an acidic pH-responsive liposome which contains (encapsulates) a VAN-prodrug; this embodiment also provides superior anti-microbial effect (e.g., anti-MRSA effect).

Figure 19A:
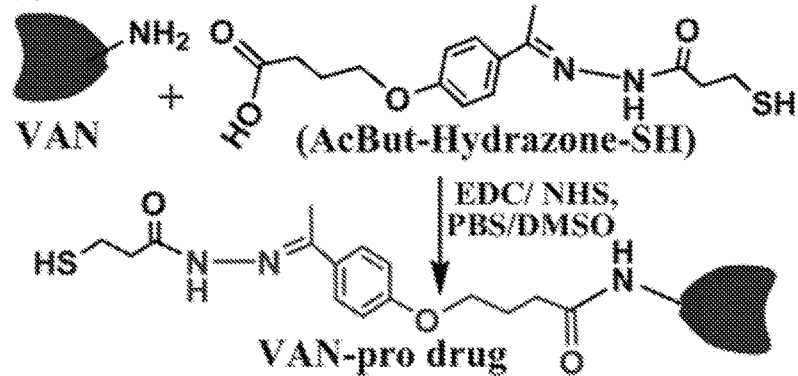
FIG. 19A-19D illustrate the construction and use of acidic pH responsive antibiotic-prodrug (exemplified with VAN-prodrug) encapsulated liposomes. Chemical conjugation of VAN-N$H_2$ with —COOH of an acidic pH responsive linker, such as AcBut-Hydrazone-SH linker, yields a VAN-prodrug (namely VANPD) (FIG. 19A). That prodrug will selectively be released in low pH environment, such as environment that results from a MRSA infection. Encapsulation of VANPD into the liposome and dithiol (S—S) bridging with thiolated-lipid of liposome (FIG. 19B) may be used to enhance stability in plasma circulation. VAN-encapsulated (FIG. 19C) spherical and (FIG. 19D) non-spherical oligomicelles (OMs) are prepared and loaded into liposome containing pH responsive lipid. These liposomes will disintegrate stepwise in a low pH (e.g., MRSA) environment. This can be used to improve the penetration of VAN to bacterial cell wall.
Figure 19B:
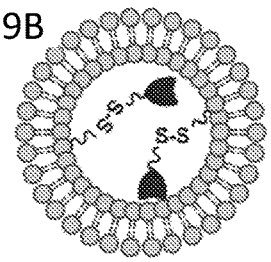

By way of example, VAN-$NH_2$ can be chemically conjugated the with —COOH group of a AcBut-Hydrazone-SH linker to obtain a VAN-prodrug (VANPD) (FIG. 19A). The —SH group of VAN-prodrug will be used for dithiol (S—S) zipped liposome preparation, which will stabilize VAN from the burst release during plasma circulation (FIG. 19B). Following that, VAN will be selectively triggered to release by the external stimulus of decreased pH in MRSA infection sites (Friedman et al., PLoS Pathog., 2006; doi:10.1371/journal.ppat.0020087). Absence of —SH group will be confirmed by Ellman's reagent test to support the formation of S—S bridges in VAN-prodrug encapsulated liposome.

Figure 19C:
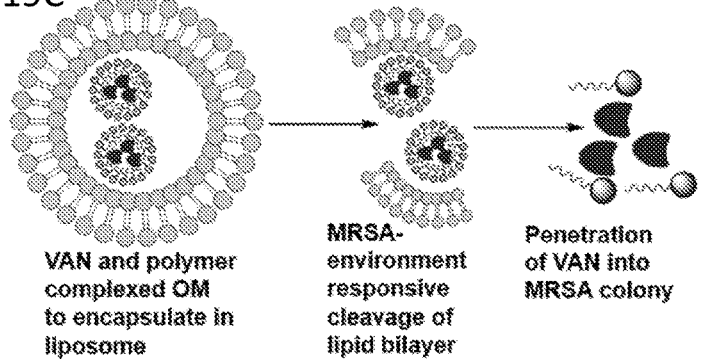
Figure 19D:
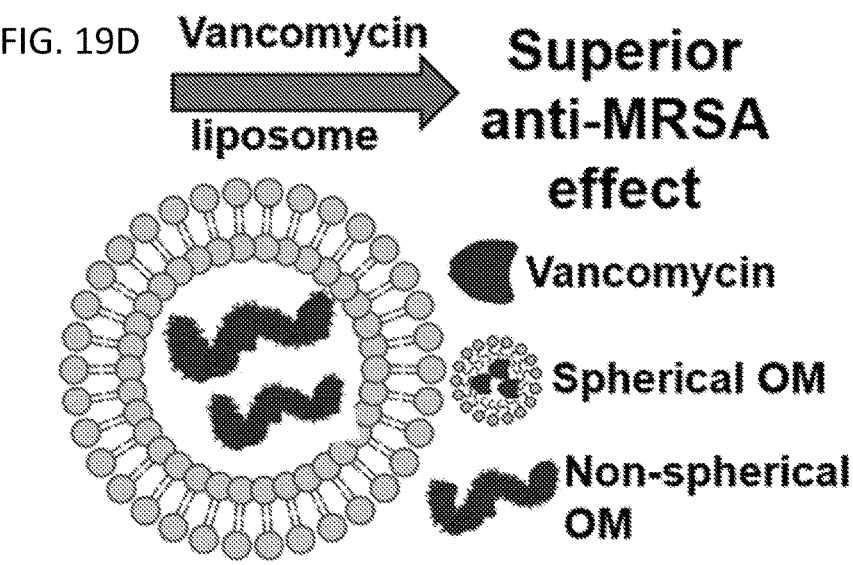

VAN-encapsulated spherical or non-spherical OMs will be loaded into the hydrophilic core of the liposomes (FIG. 19C, 19D). After in vivo administration of VAN-OMs loaded liposomes, the liposomal bilayer disintegrates in the acidic pH environment of MRSA-infection. Spherical oligomer micelle (OM) containing VAN/CFZ will be developed using Cyclodextrins, Vitamin E-TPGS, and block co-polymer using solvent evaporation and water in oil (W/O) emulsion techniques (such as those described herein). For making non-spherical OMs, co-solvent evaporation, vortexing, and brief sonication of Vitamin-E-TPGS and TPGS-SMA block polymers in the presence of amphiphilic block copolymers, such as PLA-PEG-PLA or Pluronic®-F127, will be used. Finally, in different embodiments, various sized and shaped VAN-OMs will be encapsulated inside the core of the liposomes.

As will be understood by one of ordinary skill in the art, each embodiment disclosed herein can comprise, consist essentially of or consist of its particular stated element, step, ingredient or component. Thus, the terms "include" or "including" should be interpreted to recite: "comprise, consist of, or consist essentially of." The transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment. A material effect would cause a statistically-significant reduction in infected cell killing according to protocols utilized to generate data presented in one of FIG. 5, 6, 13, or 15-18 for instance.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents, printed publications, journal articles and other written text throughout this specification (referenced materials herein). Each of the referenced materials are individually incorporated herein by reference in their entirety for their referenced teaching.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Definitions and explanations used in the present disclosure are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

What is claimed is:

1. A method of treating *Staphylococcus* (*S.*) *aureus* infection in a subject in need thereof, comprising:
    administering a therapeutically effective amount of a drug delivery system comprising vancomycin and cefazolin to the subject wherein the drug delivery system comprises a liposomal nanoparticle comprising:
        a lipid component comprising:
            a 1:0.5:0.07 ratio of hydro soy phosphatidylcholine (HSPC) to cholesterol to methoxyl polyethylene glycol (PEG)-ylated distearoyl-phosphatidyl-ethanolamine (DSPE-mPEG), or
            a 1:0.05:0.007:0.007 ratio of HSPC to cholesterol to DSPE-mPEG to DSPE-PEG-Folate, or
            a 1:0.5:0.07 ratio of N-(1-(2,3-dioleoyloxy) propyl)-N,N,N-trimethylammonium chloride (DOTAP) to cholesterol to DSPE-mPEG; and
    wherein the liposomal nanoparticle encapsulates:
        at least 10% vancomycin; and
        cefazolin, and
    wherein the nanoparticle comprises a 1:1 drug:lipid ratio, thereby treating the *S. aureus* infection in the subject.

2. The method of claim 1, wherein the liposomal nanoparticle was made using a modified water in oil (reverse phase) evaporation method described herein.

3. The method of claim 1, wherein the *S. aureus* infection is a Methicillin-Resistant *Staphylococcus aureus* (MRSA) infection or a Methicillin-Susceptible *S. aureus* (MSSA) infection.

4. The method of claim 1, wherein the drug delivery system comprises a targeting ligand, wherein the targeting ligand is selected from a leucocyte targeting ligand, a fibroblast targeting ligand, a neutrophil targeting ligand, a lymphocyte targeting ligand, a targeting ligand specific to a bacterial cell, or a targeting ligand specific to the cell of a host cell associated with a bacterial cell.

5. The method of claim 4, wherein the targeting ligand is a folate receptor beta (FRβ), a toll-like receptor (TLR), a hyaluronan receptor, a T cell receptor (TCR) of immune cells, a protein A receptor on the surface of *S. aureus*, or an extracellular protein expressed by leukocytes.

6. The method of claim 4, wherein the drug delivery system comprises one or more of folic acid, methotrexate, aminopterin, an antibody, peptides for targeting folate receptor (FR), lipopeptides, lipoprotein, small oligonucleotide sequences for targeting toll-like receptor (TLR), hyaluronic acid (HA) for targeting cluster of differentiation (CD)44, linagliptin, and/or other xanthine scaffold for targeting fibroblast activation protein (FAP) of wound fibroblast cells.

7. The method of claim 4, wherein the leucocyte targeting ligand is folic acid or another folate receptor ligand.

8. The method of claim 1, wherein the drug delivery system comprises a carbonic anhydrase (CA) targeting ligand.

9. The method of claim 8, wherein the CA targeting ligand comprises imidazole, sulfoimidazole derivative, acetazolamide; methazolamide; ethoxzolamide; dichorophenamide; dorzolamide; brinzolamide; benzolamide; topiramate; zonisamide; sulpiride; indisulam; celecoxib; valdecoxib; antibody, or a peptide.

10. The method of claim 8, wherein the CA targeting ligand is acetazolamide.

11. The method of claim 4, wherein the targeting ligand, the vancomycin, and/or the cefazolin is chemically conjugated with lipid molecule(s) of the liposomes.

12. The method of claim 1, wherein the nanoparticle comprises at least 30% vancomycin.

13. The method of claim 1, wherein the nanoparticle is within a population of nanoparticles having a mean diameter of 192.9 nm, or having a mean diameter of 176.5 nm.

14. The method of claim 5, wherein the hyaluronan receptor is CD44.

* * * * *